(12) United States Patent
Okuyama

(10) Patent No.: US 9,572,012 B2
(45) Date of Patent: Feb. 14, 2017

(54) APPARATUS, SYSTEM, AND METHOD OF MANAGING COUNTERPART TERMINAL INFORMATION AND RECORDING MEDIUM

(71) Applicant: Taro Okuyama, Tokyo (JP)

(72) Inventor: Taro Okuyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 157 days.

(21) Appl. No.: 14/552,956

(22) Filed: Nov. 25, 2014

(65) Prior Publication Data

US 2015/0148015 A1 May 28, 2015

(30) Foreign Application Priority Data

Nov. 28, 2013 (JP) .................................. 2013-245942

(51) Int. Cl.

| | | |
|---|---|---|
| *H04M 3/42* | (2006.01) | |
| *H04W 8/20* | (2009.01) | |
| *H04W 4/16* | (2009.01) | |
| *H04M 3/56* | (2006.01) | |
| *H04N 7/15* | (2006.01) | |

(Continued)

(52) U.S. Cl.

CPC .............. *H04W 8/20* (2013.01); *H04L 63/083* (2013.01); *H04L 67/303* (2013.01); *H04M 3/563* (2013.01); *H04N 7/15* (2013.01); *H04W 4/16* (2013.01); *H04M 2201/36* (2013.01); *H04M 2203/2044* (2013.01); *H04M 2203/6081* (2013.01)

(58) Field of Classification Search

CPC ......... H04W 8/20; H04W 4/16; H04L 67/303; H04L 63/083; H04N 7/15; H04M 3/563; H04M 2203/6081; H04M 2203/2044; H04M 2201/36

USPC ....................................... 455/414.1; 370/338
See application file for complete search history.

(56) References Cited

U.S. PATENT DOCUMENTS

| | | | |
|---|---|---|---|
| 8,861,377 B2 | 10/2014 | Okuyama et al. | |
| 2011/0235790 A1* | 9/2011 | Strope ..................... | H04L 12/66 379/93.02 |
| 2013/0166718 A1 | 6/2013 | Okuyama et al. | |

(Continued)

FOREIGN PATENT DOCUMENTS

| | | |
|---|---|---|
| EP | 1 679 843 A1 | 7/2006 |
| JP | 2006-197025 | 7/2006 |
| WO | WO 2012/147316 A1 | 11/2012 |

OTHER PUBLICATIONS

Extended European Search Report issued Apr. 13, 2015 in Patent Application No. 14194833.1.

*Primary Examiner* — Marcos Batista
(74) *Attorney, Agent, or Firm* — Oblon, McClelland, Maier & Neustadt, L.L.P.

(57) ABSTRACT

An apparatus, system, and method of managing candidate counterpart terminal information, each of which determines, in response to a request for adding a candidate counterpart terminal to a candidate list of a request sender terminal, whether attribute information stored in association with the request sender terminal matches attribute information stored in association with the candidate counterpart terminal to be added, and stores counterpart terminal identification information that identifies the candidate counterpart terminal in association with terminal identification information of the request sender terminal to update the candidate list of the specific request sender terminal when a determination result indicates that the attribute information match.

11 Claims, 23 Drawing Sheets

(51) Int. Cl.
*H04L 29/06* (2006.01)
*H04L 29/08* (2006.01)

(56) References Cited

U.S. PATENT DOCUMENTS

2014/0240449 A1 8/2014 Hinohara et al.
2014/0362741 A1 12/2014 Okuyama et al.

\* cited by examiner

FIG. 8

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 9

TERMINAL MANAGEMENT TABLE

| TERMINAL ID | TERMINAL NAME | ORGANIZATION | OPERATION STATE | IP ADDRESS |
|---|---|---|---|---|
| 01aa | AA TERMINAL, TOKYO OFFICE, JAPAN | KK INC. | ONLINE (COMMUNICATION OK) | 1.2.1.3 |
| 01ab | AB TERMINAL, TOKYO OFFICE, JAPAN | KK INC. | ONLINE (COMMUNICATION OK) | 1.2.1.4 |
| 01ac | AC BRANCH, Z INC. | Z INC. | OFFLINE | 1.2.2.3 |
| 01ad | AD BRANCH, Z INC. | Z INC. | ONLINE (COMMUNICATION OK) | 1.2.2.5 |
| 01ae | AE TERMINAL, TOKYO OFFICE, JAPAN | KK INC. | ONLINE (COMMUNICATING) | 1.2.2.4 |
| 01ba | BA BRANCH, Z INC. | Z INC. | ONLINE (COMMUNICATION OK) | 1.2.2.4 |
| ... | ... | ... | ... | ... |

FIG. 10

CANDIDATE LIST MANAGEMENT TABLE

| REQUEST SENDER TERMINAL ID | COUNTERPART TERMINAL ID |
|---|---|
| 01aa | 01ab,01ac,01ad,01ae |
| 01ab | 01aa,01ac |
| 01ac | 01aa,01ab,01cb,01da,01db |
| 01ad | 01aa |
| 01ae | 01ba,01cb,01da |
| ... | ... |

FIG. 11

ADDITION REQUEST MANAGEMENT TABLE

| REQUEST SENDER TERMINAL ID | REQUEST DESTINATION TERMINAL ID |
|---|---|
| 01aa | 01dc |
| 01ab | 01ca |
| 01ad | 01ba |
| ... | ... |

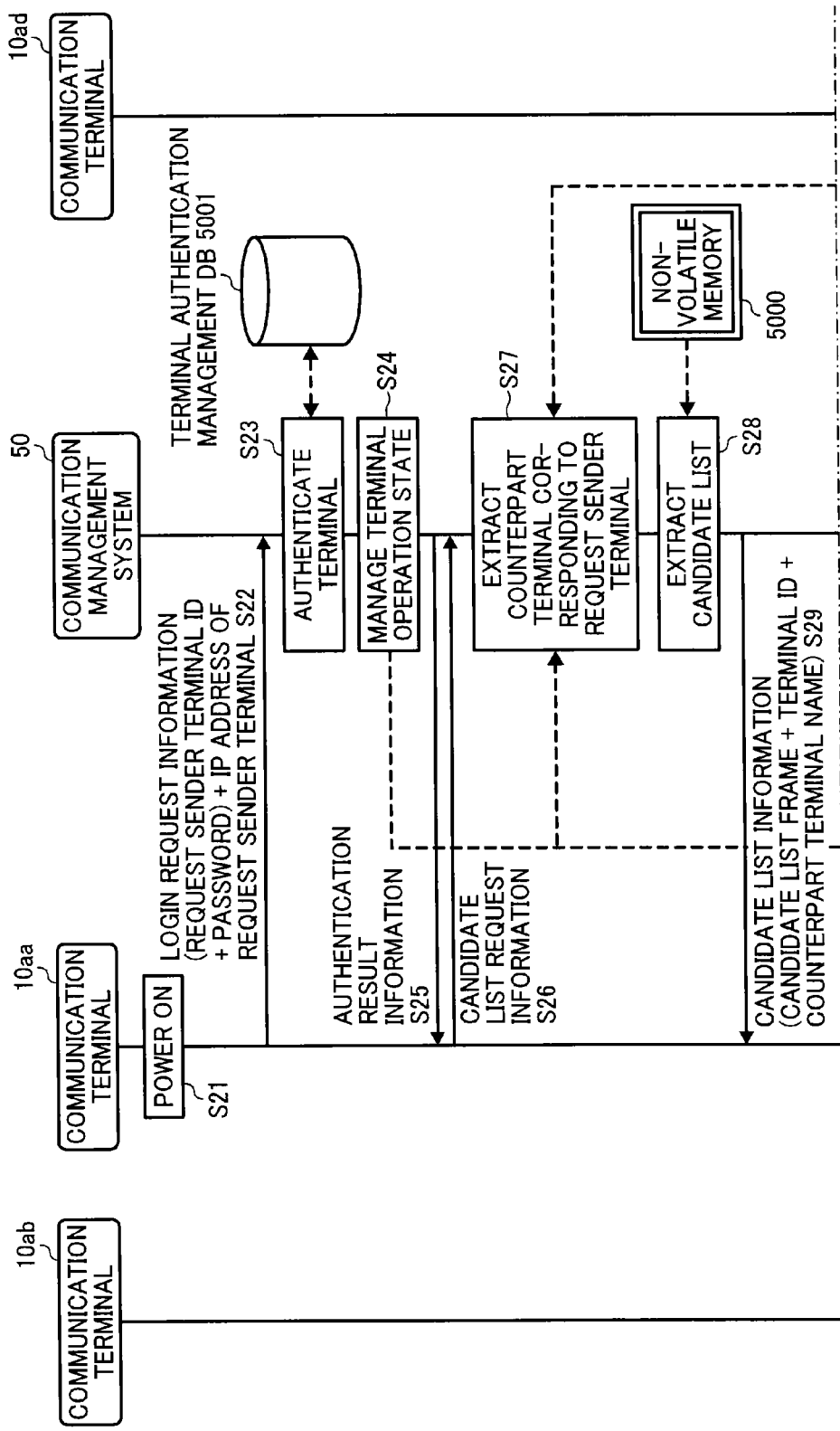

FIG. 14

| STATE | TERMINAL ID | TERMINAL NAME |
|---|---|---|
| 📞 | 10ab | AB TERMINAL, TOKYO OFFICE, JAPAN |
| 📞 | 10ac | AC BRANCH, Z INC. |
| 📞 | 10ad | AD BRANCH, Z INC. |
| 📞 | 10ae | AE TERMINAL, TOKYO OFFICE, JAPAN |

ADD COUNTERPART TERMINAL

FIG. 16

| TERMINAL NAME | TERMINAL ID | OPERATION |
|---|---|---|
| AB TERMINAL, TOKYO OFFICE, JAPAN | 01ab | EDIT \| DELETE \| SHARE |
| AC BRANCH, Z INC. | 01ac | EDIT \| DELETE \| SHARE |
| AD BRANCH, Z INC. | 01ad | EDIT \| DELETE \| SHARE |
| AE TERMINAL, TOKYO OFFICE, JAPAN | 01ae | EDIT \| DELETE \| SHARE |

ADD COUNTERPART TERMINAL

FIG. 17

| TERMINAL NAME | TERMINAL ID | OPERATION |
|---|---|---|
| AB TERMINAL, TOKYO OFFICE, JAPAN | 01ab | EDIT \| DELETE \| SHARE |
| AC BRANCH, Z INC. | 01ac | EDIT \| DELETE \| SHARE |

ADD COUNTERPART TERMINAL

COUNTERPART TERMINAL INFORMATION OF AB TERMINAL, TOKYO OFFICE, JAPAN WILL BE SHARED.
PLEASE SELECT SHARE DESTINATION.

| TERMINAL NAME | TERMINAL ID |
|---|---|
| ☐ AC BRANCH, Z INC. | 01ac |
| ☐ AD BRANCH, Z INC. | 01ad |
| ☐ AE TERMINAL, TOKYO OFFICE, JAPAN | 01ae |

SHARE   CANCEL

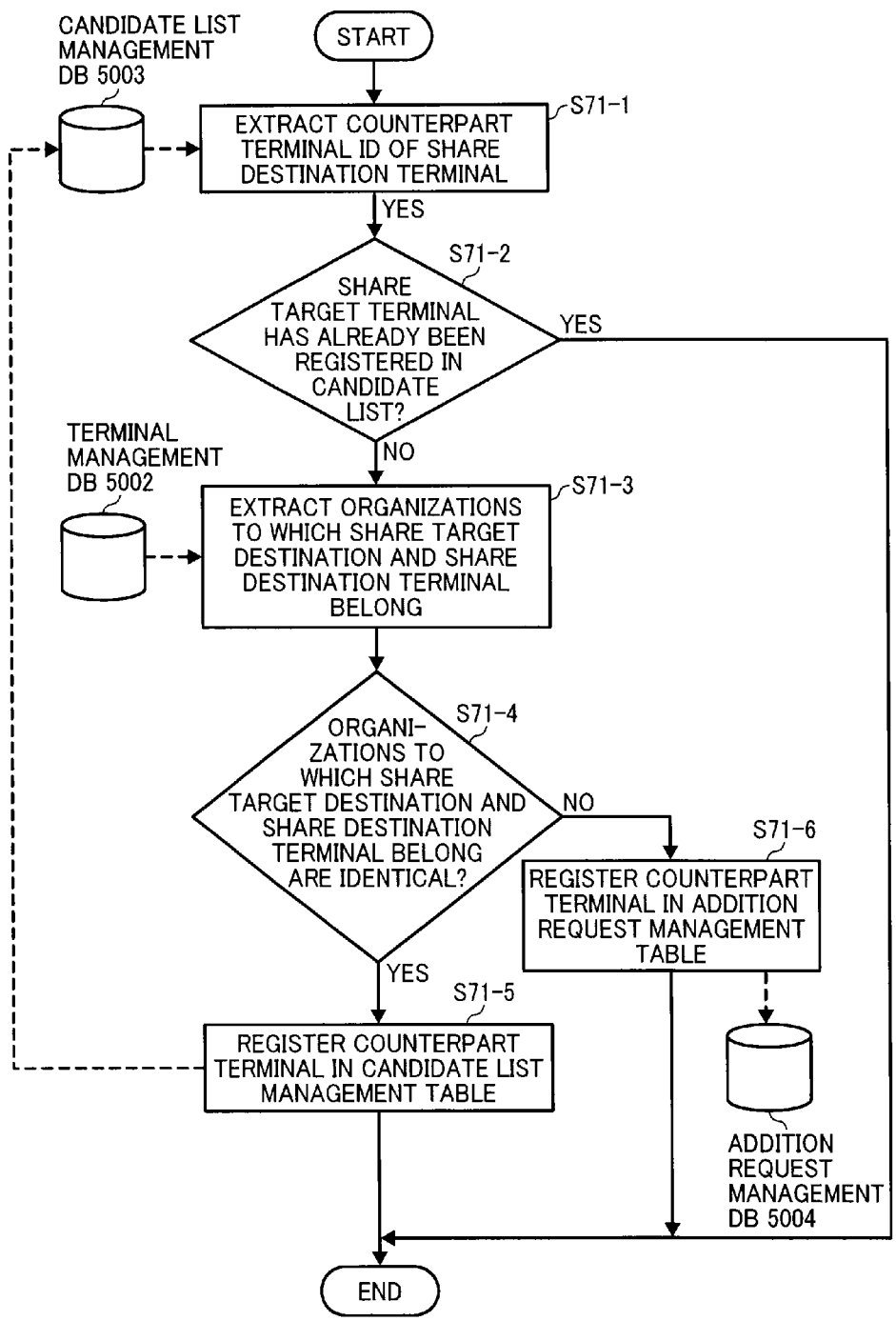

APPARATUS, SYSTEM, AND METHOD OF MANAGING COUNTERPART TERMINAL INFORMATION AND RECORDING MEDIUM

CROSS-REFERENCE TO RELATED APPLICATIONS

This patent application is based on and claims priority pursuant to 35 U.S.C. §119(a) to Japanese Patent Application No. 2013-245942, filed on Nov. 28, 2013, in the Japan Patent Office, the entire disclosure of which is hereby incorporated by reference herein.

BACKGROUND

Technical Field

The present invention relates to managing counterpart terminal information indicating a candidate of counterpart terminal for a terminal.

Description of the Related Art

Communication systems that perform a videoconference, communication, or the like via a communication network such as the Internet, a dedicated line, or the like have become popular in recent years due to a demand for reducing business trip cost, time, and the like. In such a communication system, once communication between a plurality of communication terminals starts, image data and audio data are transmitted and received.

In the recent mobile phone communication systems, counterpart terminal information, such as phone numbers of counterpart terminals that a terminal frequently calls, may be previously registered in an address book of the terminal. At the time of starting communication, the desired counterpart terminal information is selected using a key, thus reducing the burden of inputting counterpart terminal information before starting communication. To further reduce the burden in previously registering counterpart terminal information in the address book, counterpart terminal information of counterpart terminals managed by the terminal may be sent, for example, using infrared rays, to the other terminal to be registered in the address book of the other terminal. However, the content of information that can be transmitted to the other terminal may be restricted, for example, to only the address information of the terminal, to improve information security or personal information security.

JP-2006-197025-A discloses a method of configuring a group of a plurality of members and allowing the members of the group to use various types of information accumulated in a server. For example, a system provides safe sharing of resources between devices after determination of whether each device belongs to the same group on the basis of group information supplied from a cellular mobile station.

SUMMARY

The present inventors have found that, even in the case where the owner of counterpart terminal information and a requester to use the counterpart terminal information belong to the same group, the requester may not be permitted to use the counterpart terminal information, depending on the relationship between a counterpart terminal indicated by the counterpart terminal information and the requester. In view of this, in case where the requester requests to add a specific candidate counterpart terminal to the counterpart terminal information, the owner of the counterpart terminal information asks the specific candidate counterpart terminal whether registration is permitted.

Example embodiments of the present invention include an apparatus, system, and method of managing candidate counterpart terminal information, each of which: stores, for each one of a plurality of terminals, attribute information relating to an attribute of the terminal in association with terminal identification information that identifies the terminal; stores, for each one of one or more request sender terminals of the plurality of terminals, a candidate list of one or more candidate counterpart terminals of the plurality of terminals that the request sender terminal is capable of starting communication with; receives a request for adding a specific candidate counterpart terminal of the plurality of terminals in the candidate list of a specific request sender terminal of the plurality of terminals; and determines whether attribute information stored in association with the specific request sender terminal matches attribute information stored in association with the specific candidate counterpart terminal to be added, and stores counterpart terminal identification information that identifies the specific candidate counterpart terminal in association with terminal identification information of the specific request sender terminal to update the candidate list of the specific request sender terminal when a determination result indicates that the attribute information match.

Example embodiments of the present invention include a non-transitory recording medium storing a program for managing candidate counterpart terminal information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a conceptual diagram illustrating a terminal authentication management table;

FIG. 9 is a conceptual diagram illustrating a terminal management table;

FIG. 10 is a conceptual diagram illustrating a candidate list management table;

FIG. 11 is a conceptual diagram illustrating an addition request management table;

FIGS. 13A and 13B (FIG. 13) are a sequence diagram illustrating operation of preparing for starting communication between communication terminals;

FIG. 14 is a conceptual diagram illustrating a candidate list;

FIG. 16 is a conceptual diagram illustrating a candidate list;

FIG. 17 is a conceptual diagram illustrating a share destination acceptance screen;

FIG. 18 is a flowchart illustrating operation of processing share request information;

Figure 1:
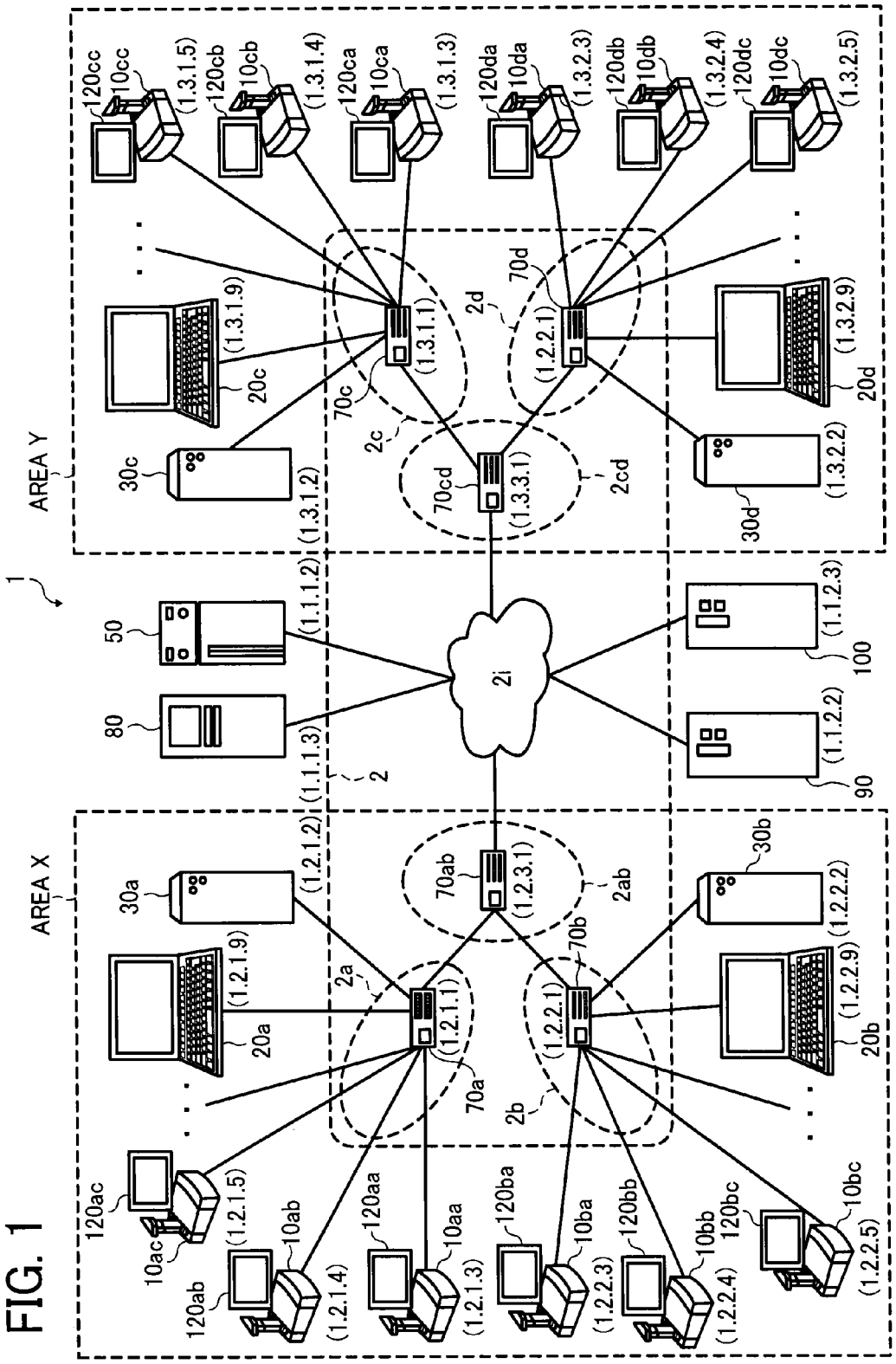
FIG. 1 is a schematic diagram of a communication system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, an embodiment of the present invention will be described using the drawings.

<<Overall Configuration of System>>

Figure 2:
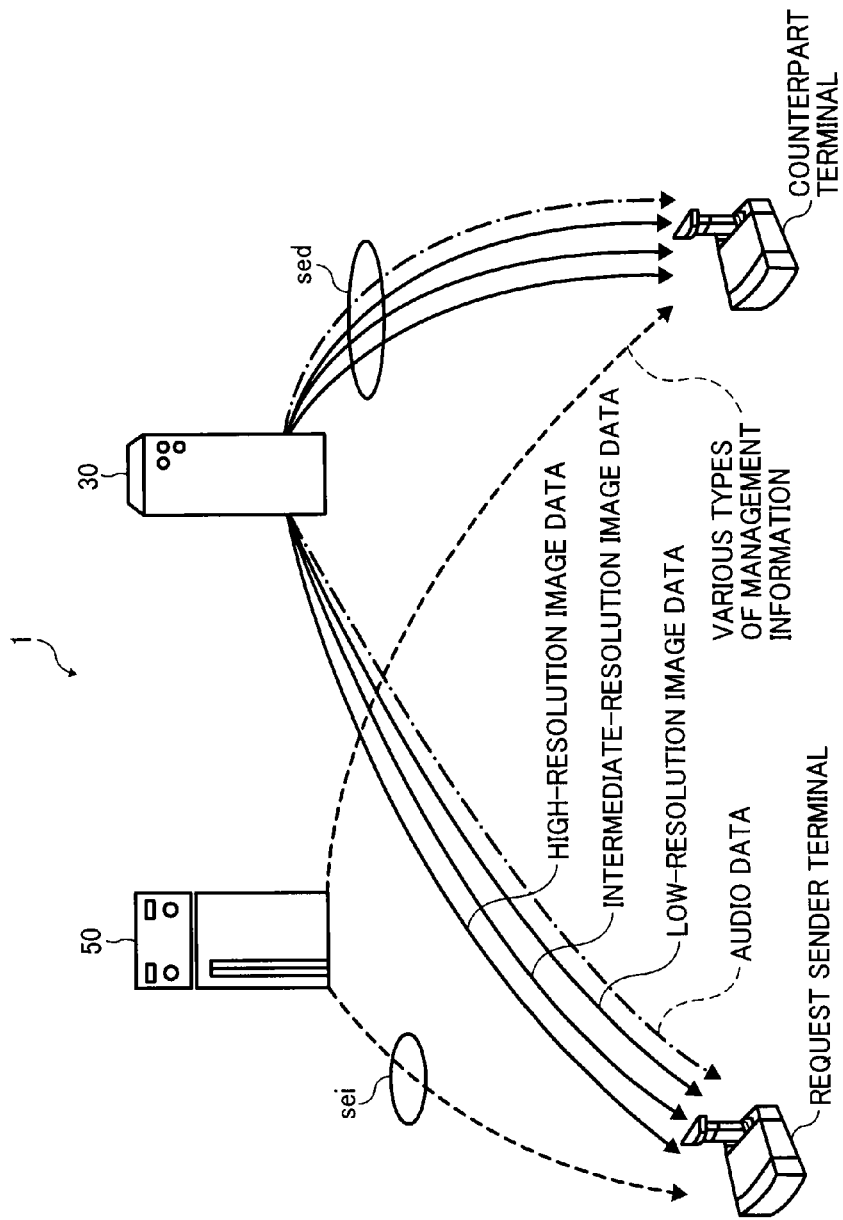
FIG. 2 is a conceptual diagram illustrating a transmission/reception state of image data, audio data, and various types of information in the communication system of FIG. 1.
Figure 3:
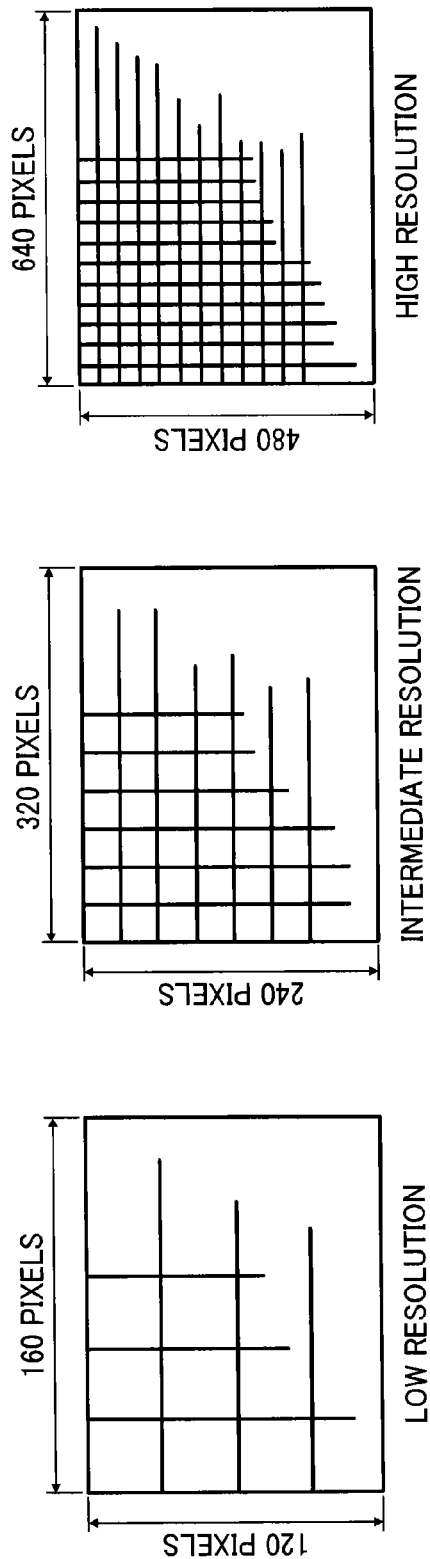
FIGS. 3A to 3C are conceptual diagrams describing the image quality of image data.

FIG. 1 is a schematic diagram of a communication system 1 according to an embodiment of the present invention. FIG. 2 is a conceptual diagram illustrating a transmission/reception state of image data, audio data, and various types of information in the communication system 1. FIGS. 3A to 3C are conceptual diagrams describing the image quality of image data.

In this example, the communication system 1 is implemented by a communication system that intercommunicates information, including information that reflects feelings, between a plurality of communication terminals 10 via a communication management system 50. The communication system is a system for intercommunicating information, feelings, or the like between a plurality of communication terminals via a communication management system, and examples thereof include a teleconference system and a videoconference system.

In the embodiment, the communication system, the communication management system, and the communication terminal will be described while assuming a videoconference system serving as an example of the communication system, a videoconference management system serving as an example of the communication management system, and a videoconference terminal serving as an example of the communication terminal. That is, the communication terminal and the communication management system according to the embodiment of the present invention are applied not only to a videoconference system, but also to any desired communication system.

In this embodiment, the terminals in the communication system 1 are located in one of four offices, namely, a Tokyo office (user a), an Osaka office (user b), a New York office (user c), and a Washington D.C. office (user d).

First, the communication system 1 illustrated in FIG. 1 includes a plurality of communication terminals (10*aa*, 10*ab*, . . . ), displays (120*aa*, 120*ab*, . . . ) for the respective communication terminals (10*aa*, 10*ab*, . . . ), user personal computer (PC) terminals (20*a*, 20*b*, 20*c*, and 20*d*), a plurality of relay devices (30*a*, 30*b*, 30*c*, and 30*d*), the communication management system 50, a communication terminal management system 80, a program providing system 90, and a maintenance system 100.

The plurality of communication terminals 10 perform communication by transmitting and receiving image data and audio data serving as examples of content data.

Hereinafter, the "communication terminal" may simply be represented as the "terminal". In addition, an arbitrary one or ones of the plurality of terminals (10*aa*, 10*ab*, . . . ) is/are represented as a "terminal(s) 10". An arbitrary one or ones of the plurality of displays (120*aa*, 120*ab*, . . . ) is/are represented as a "display(s) 120". An arbitrary one or ones of the plurality of relay devices (30*a*, 30*b*, 30*c*, and 30*d*) is/are represented as a "relay device(s) 30". In addition, the user PC terminals (20*a*, 20*b*, 20*c*, and 20*d*) are respectively represented as the PCs (20*a*, 20*b*, 20*c*, and 20*d*), and further an arbitrary one or ones of these PCs is/are represented as a "PC(s) 20". Further, a terminal serving as a request sender terminal that gives a request to start a videoconference is represented as a "request sender terminal", and a terminal serving as a counterpart terminal that is a request destination (relay destination) is represented as a "counterpart terminal".

In addition, as illustrated in FIG. 2, a management information session sei for transmitting and receiving various types of management information is established via the communication management system 50 between a terminal and a counterpart terminal in the communication system 1. In addition, four sessions for transmitting and receiving four items of data, namely, high-resolution image data, intermediate-resolution image data, low-resolution image data, and audio data, are established via a relay device 30 between the terminal and the counterpart terminal. Here, these four sessions are collectively indicated as an image/audio data session sed.

Here, the resolution of images of image data handled in the embodiment will be described. There are the following images: a low-resolution image, serving as a base image, having horizontal 160 pixels by vertical 120 pixels, as illustrated in FIG. 3A; an intermediate-resolution image having horizontal 320 pixels by vertical 240 pixels, as illustrated in FIG. 3B; and a high-resolution image having horizontal 640 pixels by vertical 480 pixels, as illustrated in FIG. 3C. In the case of a narrowband path, low-quality image data that only includes low-resolution image data serving as a base image is relayed. In the case of a relatively wide band, intermediate-quality image data including low-resolution image data serving as a base image and intermediate-resolution image data is relayed. In the case of a very wide band, high-quality image data including low-resolution image data serving as a base image, intermediate-resolution image data, and high-resolution image data is relayed.

The PCs (20a, 20b, 20c, and 20d) are respectively connected to local area networks (LANs) (2a, 2b, 2c, and 2d). In this embodiment, the user is allowed to use a PC 20 instead of a terminal 10, to perform operation or input. For example, there may be a case in which a user is not used to perform operation or input with the operation keys 108 of a terminal 10, or the case in which a user who is currently using a PC 20 is unable to immediately know that there has been the above-described deletion request. In addition, the communication terminal management system 80 is connected to the Internet 2i and performs processing to convey to the communication management system 50 various requests or the like from a PC 20 by exchanging information with the PC 20.

The relay devices 30 illustrated in FIG. 1 relay content data between the plurality of terminals 10. The communication management system 50 collectively manages login authentication from the terminals 10, the communication states, candidate lists, and so forth of the terminals 10, and the communication states and so forth of the relay devices 30. Note that an image of image data may be a moving image or a still image, or may include both thereof.

A plurality of routers (70a, 70b, 70c, 70d, 70ab, and 70cd) select an optimal path for image data and audio data. Hereinafter, an arbitrary one or ones of the routers (70a, 70b, 70c, 70d, 70ab, and 70cd) is/are represented as a "router(s) 70".

The program providing system 90 includes a hard disk (HD) 204 described later. The HD 204 stores a terminal program for causing a terminal 10 to realize various functions (or for causing a terminal 10 to function as various elements), and the terminal program can be transmitted to the terminal 10. In addition, the HD 204 of the program providing system 90 stores a relay device program for causing a relay device 30 to realize various functions (or for causing a relay device 30 to function as various elements), and the relay device program can be transmitted to the relay device 30. Further, the HD 204 of the program providing system 90 stores a communication management program for causing the communication management system 50 to realize various functions (or for causing the communication management system 50 to function as various elements), and the communication management program can be transmitted to the management system 50.

The maintenance system 100 may be one or more computers for performing maintenance, management, or conservation of at least one of the terminals 10, the relay devices 30, the communication management system 50, and the program providing system 90. For example, in the case where the maintenance system 100 is located in one country, and the terminals 10, the relay devices 30, the communication management system 50, or the program providing system 90 is/are located outside that country, the maintenance system 100 remotely performs, via a communication network 2, maintenance, management, or conservation of at least one of the terminals 10, the relay devices 30, the communication management system 50, and the program providing system 90. In addition, the maintenance system 100 performs maintenance such as management of the modal number, serial number, sales contact, maintenance checkup, or a past history of failures of at least one of the terminals 10, the relay devices 30, the communication management system 50, and the program providing system 90 without having the communication network 2 therebetween.

The terminals (10aa, 10ab, 10ac, . . . ), the relay device 30a, and the router 70a are connected to be communicable with each other by a LAN 2a. The terminals (10ba, 10bb, 10bc, . . . ), the relay device 30b, and the router 70b are connected to be communicable with each other by a LAN 2b. In addition, the LAN 2a and the LAN 2b are connected to be communicable with each other by a dedicated line 2ab including the router 70ab and are configured in a certain area A. For example, the area A is Japan, the LAN 2a is configured in the office in Tokyo, and the LAN 2b is configured in the office in Osaka.

The terminals (10ca, 10cb, 10cc, . . . ), the relay device 30c, and the router 70c are connected to be communicable with each other by a LAN 2c. The terminals (10da, 10db, 10dc, . . . ), the relay device 30d, and the router 70d are connected to be communicable with each other by a LAN 2d. In addition, the LAN 2c and the LAN 2d are connected to be communicable with each other by a dedicated line 2cd including the router 70cd and are configured in a certain area B. For example, the area B is the United States, the LAN 2c is configured in the office in New York, and he LAN 2d is configured in the office in Washington D.C. The area A and the area B are connected to be communicable with each other from the routers (70ab and 70cd), respectively, via the Internet 2i.

In addition, the communication management system 50 and the program providing system 90 are connected to be communicable with the terminals 10 and the relay devices 30 via the Internet 2i. The communication management system 50 and the program providing system 90 may be located in the area A or the area B, or may be located in other areas.

In the embodiment, the communication network 2 of the embodiment includes the LAN 2a, the LAN 2b, the dedicated line 2*ab*, the Internet 2*i*, the dedicated line 2*cd*, the LAN 2*c*, and the LAN 2*d*. The communication network 2 may include not only a wired network, but also a network where communication is performed wirelessly, such as Wireless Fidelity (WiFi) or Bluetooth (registered trademark).

In addition in FIG. 1, four digits indicated below each of the terminals 10, each of the relay devices 30, the communication management system 50, each of the routers 70, and the program providing system 90 indicates an IP address in an abbreviated form in the general Internet Protocol version 4 (IPv4). For example, the IP address of the terminal 10*aa* is "1.2.1.3". Although IPv6 may be used instead of IPv4, IPv4 is used in order to make the description simple.

Note that, in the communication system 1 of the embodiment, communication between terminals 10 that belong to the same organization, such as in-house communication, has been approved in advance by the users of the terminals 10. In addition, the terminals 10 may be used not only for communication between different offices or for communication between different rooms in the same office, but also for communication within the same room or for outdoor-indoor communication or outdoor-outdoor communication. In the case where the terminals 10 are used outside, wireless communication using a cellular phone communication network or the like is performed.

<<Hardware Configuration of Communication System>>

Figure 4:
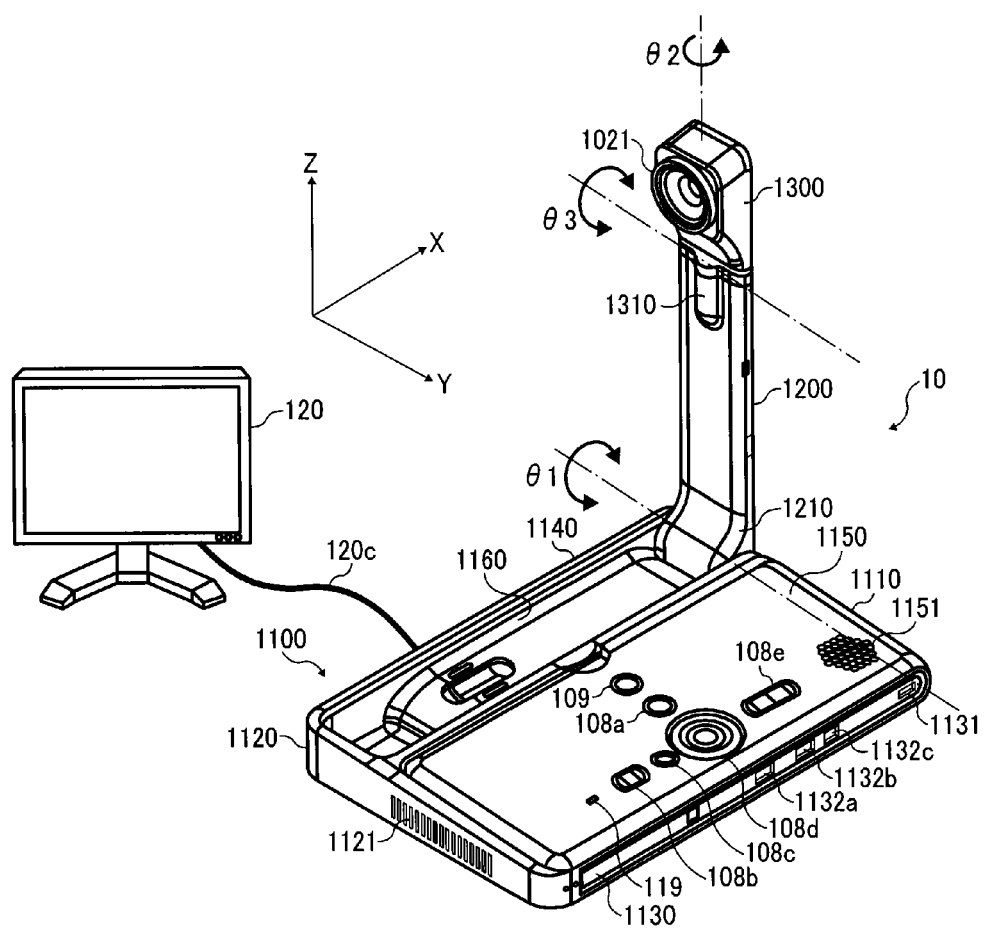
FIG. 4 is an external view of the terminal in the communication system of FIG. 1.

Next, the hardware configuration of each device in the communication system 1 of the embodiment will be described. FIG. 4 is an external view of a terminal 10 according to the embodiment. The description will be given assuming that the longitudinal direction of the terminal 10 is the X-axis direction, a direction orthogonal to the X-axis direction on one plane is the Y-axis direction, and a direction orthogonal to the X-axis direction and the Y-axis direction (vertical direction) is the Z-axis direction.

As illustrated in FIG. 4, the terminal 10 includes a casing 1100, an arm 1200, and a camera housing 1300. Among these portions, a front wall 1110 of the casing 1100 has an inlet face (not illustrated) including a plurality of inlet holes, and a back wall 1120 of the casing 1100 has an exhaust face 1121 on which a plurality of exhaust holes are formed. Accordingly, by driving of a cooling fan included in the casing 1100, air behind the terminal 10 can be taken in via the inlet face (not illustrated) and exhausted to the rear of the terminal 10 via the exhaust face 1121. A right-side wall 1130 of the casing 1100 has a sound pickup hole 1131 formed thereon, and a built-in microphone 114, described later, is capable of picking up sound and noise.

An operation panel 1150 is formed toward the right-side wall 1130 of the casing 1100. The operation panel 1150 has a plurality of operation keys (108*a* to 108*e*) described later, a power switch 109 described later, and an alarm lamp 119 described later, which are formed thereon. In addition, the operation panel 1150 has a sound output face 1151 formed thereon, which is formed of a plurality of sound output holes for allowing output sound from a built-in speaker 115 described later to pass through. In addition, an accommodating portion 1160 serving as a recess for accommodating the arm 1200 and the camera housing 1300 is formed toward a left-side wall 1140 of the casing 1100. A plurality of connection ports (1132*a* to 1132*c*) for electrically connecting cables to an external device connection interface (I/F) 118 described later are provided on the right-side wall 1130 of the casing 1100. In contrast, a connection port for electrically connecting a cable 120*c* for a display 120 to the external device connection I/F 118 described later is provided toward the left-side wall 1140 of the casing 1100.

The following description uses the term "operation key(s) 108" for indicating an arbitrary one or ones of the operation keys (108*a* to 108*e*), and the term "connection port(s) 1132" for indicating an arbitrary one or ones of the connection ports (1132*a* to 1132*c*).

Next, the arm 1200 is attached to the casing 1100 via a torque hinge 1210 and is configured to be rotatable in the vertical direction within the range of a tilt angle θ1 of 135 degrees with respect to the casing 1100. FIG. 4 indicates a state in which the tilt angle θ1 is 90 degrees.

The camera housing 1300 has a built-in camera 112 provided thereon, which will be described later, and the camera 112 can capture an image of a user, a document, a room, or the like. In addition, the camera housing 1300 has a torque hinge 1310 formed thereon. The camera housing 1300 is attached to the arm 1200 via the torque hinge 1310 and is configured to be rotatable in the vertical and horizontal directions within a range of a pan angle θ2 of ±180 degrees and a tilt angle θ3 of ±45 degrees with respect to the state illustrated in FIG. 4 serving as 0 degrees.

Since the relay devices 30, the communication management system 50, the program providing system 90, and the maintenance system 100 have the same appearance as that of a general server computer, descriptions of the appearances thereof are omitted.

Figure 5:
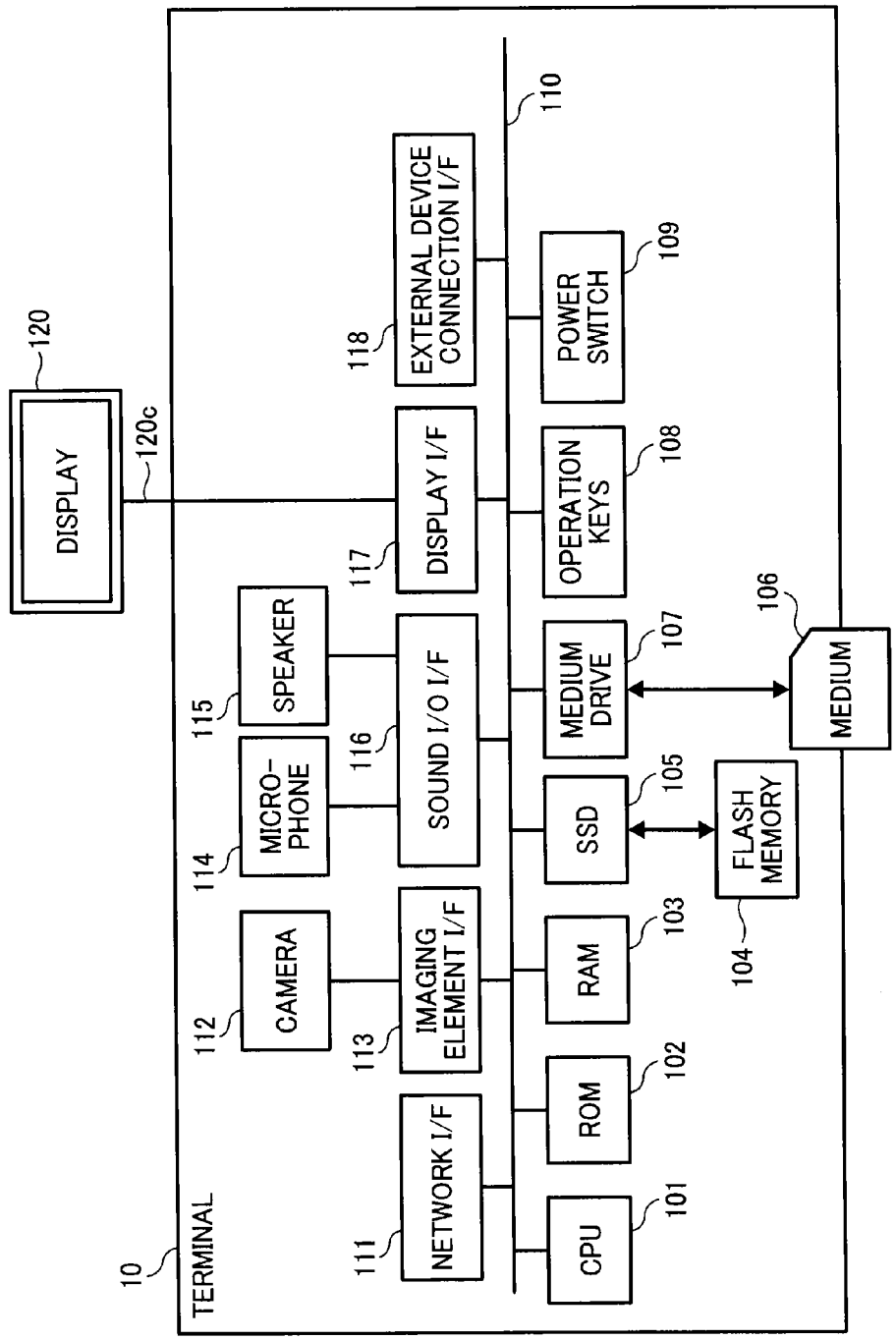
FIG. 5 is a hardware configuration diagram of the communication terminal of FIG. 4.

FIG. 5 is a hardware configuration diagram of the terminal 10 according to the embodiment of the present invention. As illustrated in FIG. 5, the terminal 10 includes a central processing unit (CPU) 101 that controls entire operation of the terminal 10, a read-only memory (ROM) 102 that stores a program used for controlling the CPU 101, such as an initial program loader (IPL), a random-access memory (RAM) 103 used as a work area for the CPU 101, a flash memory 104 that stores various types of data, such as the terminal program, image data, and audio data, a solid state drive (SSD) 105 that controls reading/writing of various types of data from/to the flash memory 104 under control of the CPU 101, a medium drive 107 that controls reading/writing (storage) of data from/to a recording medium 106 such as a flash memory, the operation keys 108 operated in the case of for example, selecting a counterpart terminal for the terminal 10, the power switch 109 for turning ON/OFF the power of the terminal 10, and a network interface (I/F) 111 for communicating data using the communication network 2.

In addition, the terminal 10 includes the built-in camera 112, which captures an image of a subject and obtains image data under control of the CPU 101, an imaging element I/F 113 that controls driving of the camera 112, the built-in microphone 114, which receives an audio input, the built-in speaker 115, which outputs sound, an audio input/output I/F 116 that processes inputting/outputting of an audio signal between the microphone 114 and the speaker 115 under control of the CPU 101, a display I/F 117 that transmits image data to an external display 120 under control of the CPU 101, the external device connection I/F 118 connected to a connection port 1021*g* illustrated in FIG. 4 in order to connect various external devices, the alarm lamp 119, which indicates an abnormality of various functions of the terminal 10, and a bus line 110 such as an address bus and a data bus for electrically connecting the above-described elements as illustrated in FIG. 8.

The display 120 may be implemented by a liquid crystal or organic electroluminescence (EL) that displays an image of a subject, an operation icon, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

Note that the recording medium 106 is configured to be removable from the terminal 10. In addition, a non-volatile memory that reads or writes data under control of the CPU 101 is not limited to the flash memory 104, and an electrically erasable and programmable read-only memory (EEPROM) may be used instead.

Further, the terminal program may be recorded in a file in an installable format or an executable format on a computer-readable recording medium such as the recording medium 106 and circulated. In addition, the terminal program may be stored on the ROM 102, instead of the flash memory 104.

Figure 6:
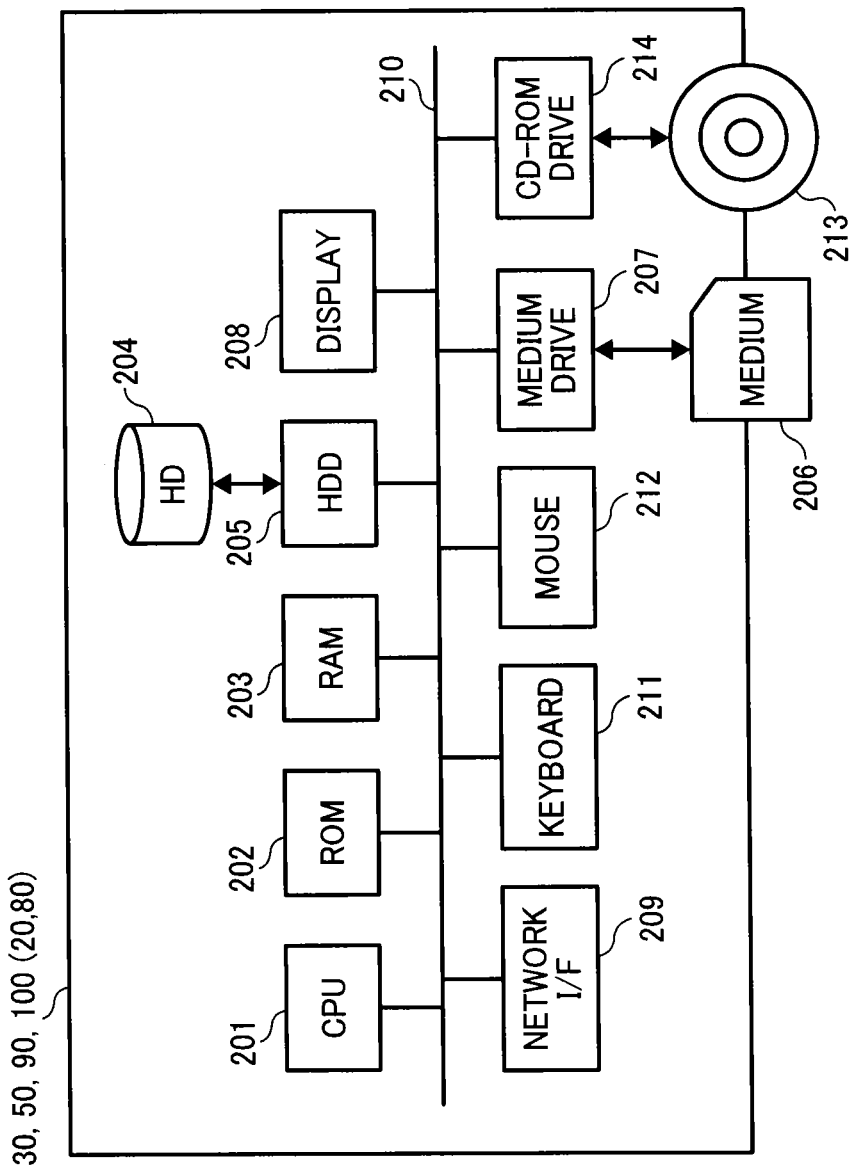
FIG. 6 is a hardware configuration diagram of a communication management system, a relay device, a program providing system, a maintenance system, or a communication terminal management system of the communication system of FIG. 1.

FIG. 6 is a hardware configuration diagram of the communication management system 50 according to the embodiment of the present invention. The communication management system 50 includes a CPU 201 that controls entire operation of the communication management system 50, a ROM 202 that stores a program used for controlling the CPU 201, such as an IPL, a RAM 203 used as a work area for the CPU 201, an HD 204 that stores various types of data, such as the communication management program, a hard disk drive (HDD) 205 that controls reading/writing of various types of data from/to the HD 204 under control of the CPU 201, a medium drive 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements.

Note that the communication management program may be recorded in a file in an installable format or an executable format on a computer-readable recording medium such as the recording medium 206 or the CD-ROM 213 and distributed. In addition, the communication management program may be stored on the ROM 202, instead of the HD 204.

Since the relay devices 30 have a hardware configuration that is the same as or similar to that of the above-described communication management system 50, a description thereof is omitted. Note that the HD 204 stores a relay device program for controlling the relay devices 30. Also in this case, the relay device program may be recorded in a file in an installable format or an executable format on a computer-readable recording medium such as the recording medium 206 or the CD-ROM 213 for distribution. The relay device program may be stored on the ROM 202, instead of the HD 204.

Since a PC 20 and the communication terminal management system 80 have the same appearance as that of a general server computer, descriptions of the appearances thereof are omitted. Further, since a PC 20 and the communication terminal management system 80 have a hardware configuration that is the same as or similar to that of the above-described communication management system 50, descriptions thereof are omitted.

In addition, since the program providing system 90 and the maintenance system 100 each have a hardware configuration that is the same as or similar to that of the above-described communication management system 50, descriptions thereof are omitted. Note that the HD 204 stores a program providing program for controlling the program providing system 90. Also in this case, the program providing program may be recorded in a file in an installable format or an executable format on a computer-readable recording medium such as the recording medium 206 or the CD-ROM 213 for distribution. The program providing program may be stored on the ROM 202, instead of the HD 204.

Note that each of the above-described programs may be recorded on a computer-readable recording medium such as a compact disc recordable (CD-R), a digital versatile disk (DVD), or a Blu-ray disk, which serve as other examples of the above-described removable recording medium, for distribution.

<<Functional Configuration of Communication System>>

Figure 7:
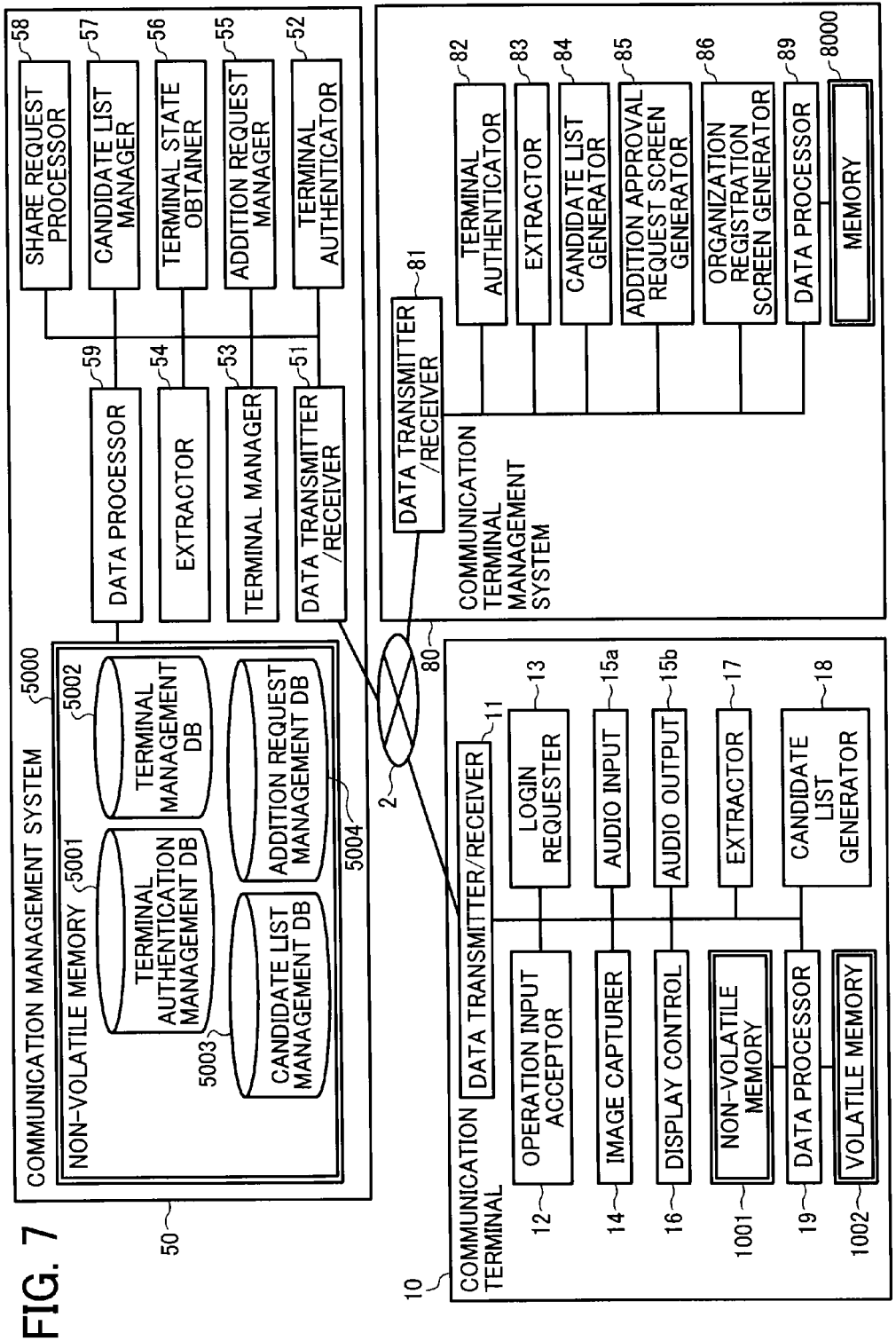
FIG. 7 is a functional block diagram of a communication terminal, a communication terminal management system, and a communication management system included in the communication system of FIG. 1.

Next, the functional configuration of the communication system 1 according to the embodiment will be described. FIG. 7 is a functional block diagram of a communication terminal 10 and the communication management system 50 included in the communication system 1 of the embodiment. In FIG. 7, the terminal 10 and the communication management system 50 are connected to be capable of communicating data via the communication network 2. Also in FIG. 7, the communication management system 50 and the communication terminal management system 80 are connected to be capable of communicating data via the communication network 2. Since the program providing system 90 illustrated in FIG. 1 is not directly related to videoconference communication, the program providing system 90 is omitted in FIG. 7. Also, since PCs 20 illustrated in FIG. 1 are general PCs, they are omitted in FIG. 7.

<Functional Configuration of Terminal>

The terminal 10 includes a data transmitter/receiver 11, an operation input acceptor 12, a login requester 13, an image capturer 14, an audio input 15a, an audio output 15b, a display control 16, an extractor 17, a candidate list generator 18, and a data processor 19. These elements are functions that are realized by or that are caused to function by operating any of the elements illustrated in FIG. 5 in response to a command from the CPU 101 in accordance with a terminal program expanded from the flash memory 104 to the RAM 103.

In addition, the terminal 10 includes a volatile memory 1002 configured by the RAM 103 illustrated in FIG. 5, and a non-volatile memory 1001 configured by the flash memory 104 illustrated in FIG. 5.

(Functional Configuration of Terminal)

Next, referring to FIGS. 5 and 7, functional configuration of the terminal 10 will be described. Note that, in the following description of functional configuration of the terminal 10, among elements illustrated in FIG. 5, relationships with main elements for realizing functional configuration of the terminal 10 will also be described.

The data transmitter/receiver 11 of the terminal 10 illustrated in FIG. 7 is realized by a command from the CPU 101 illustrated in FIG. 5 and by the network I/F 111 illustrated in FIG. 5, and performs transmission/reception of various types of data (or information) to/from another terminal 10, apparatus, or system via the communication network 2. Before starting communication with a desired counterpart terminal, the data transmitter/receiver 11 starts receiving, from the communication management system 50, operation state information indicating the operation state of each terminal 10 serving as a candidate counterpart terminal. The operation state information not only indicates the operation state of each terminal 10 (whether the terminal 10 is online or offline), but also indicates a detailed state such as whether the terminal 10 whose state is online is now communicating or the user of the terminal 10 is not at the terminal 10. In addition, the operation state information not only indicates the operation state of each terminal 10, but also indicates various states, such as the state that the cable 120c is disconnected from the terminal 10, the state that the terminal 10 can output audio but not images, or the state that the terminal 10 is muted.

The operation input acceptor 12 is realized by a command from the CPU 101 illustrated in FIG. 5 and by the operation keys 108 and the power switch 109 illustrated in FIG. 5, and accepts various inputs from the user. For example, when the user turns ON the power switch 109 illustrated in FIG. 5, the operation input acceptor 12 illustrated in FIG. 7 accepts the power ON operation and turns ON the power.

The login requester 13 is realized by a command from the CPU 101 illustrated in FIG. 5, and, in response to acceptance of the above-mentioned power ON operation, automatically transmits, from the data transmitter/receiver 11 to the communication management system 50 via the communication network 2, login request information indicating a login request and the current IP address of the terminal. In addition, when the user turns the power switch 109 from ON to OFF, the data transmitter/receiver 11 transmits to the communication management system 50 state information indicating that the power is to be turned OFF, and then the operation input acceptor 12 completely turns OFF the power. Accordingly, the communication management system 50 side can detect that the power of the terminal 10 is turned from ON to OFF.

The image capturer 14 is realized by a command from the CPU 101 illustrated in FIG. 5 and by the camera 112 and the imaging element I/F 113 illustrated in FIG. 5. The image capturer 14 captures an image of an object and outputs image data obtained by capturing the image.

The audio input 15a is realized by a command from the CPU 101 illustrated in FIG. 5 and by the audio input/output I/F 116 illustrated in FIG. 5. After the voice of the user is converted to an audio signal by the microphone 114, the audio input 15a receives audio data according to the audio signal. The audio output 15b is realized by a command from the CPU 101 illustrated in FIG. 5 and by the audio input/output I/F 116 illustrated in FIG. 5, and outputs the audio signal according to the audio data to the speaker 115, and the speaker 115 outputs audio.

The display control 16 is realized by a command from the CPU 101 illustrated in FIG. 5 and by the display I/F 117 illustrated in FIG. 5, and performs control for transmitting image data to an external display 120.

The extractor 17 is realized by a command from the CPU 101 illustrated in FIG. 5, and extracts various types of data (or information) from the volatile memory 1002.

The candidate list generator 18 generates and updates a candidate list in which an icon indicates the state of a candidate counterpart terminal as illustrated in FIG. 14 on the basis of candidate list information described later and state information of each terminal 10 serving as a candidate counterpart terminal, which are received from the communication management system 50.

In addition, the data processor 19 is realized by a command from the CPU 101 illustrated in FIG. 5 and by the SSD 105 illustrated in FIG. 5, and performs processing to store various types of data in the non-volatile memory 1001 or to read various types of data stored in the non-volatile memory 1001. The non-volatile memory 1001 stores a terminal identification (ID) serving as an example of identification information for identifying the terminal 10, a password, and the like. Further, the data processor 19 performs processing to store various types of data in the volatile memory 1002 or to read various types of data stored in the volatile memory 1002. In addition, every time image data and audio data are received in performing communication with a counterpart terminal, the volatile memory 1002 overwrites the image data and audio data. Among these items of data, on the basis of image data before being overwritten, an image is displayed on the display 120, and, on the basis of audio data before being overwritten, audio is output from the speaker 115.

Note that, in the embodiment, a terminal ID and a relay device ID described later indicate identification information such as a language, a character(s), a symbol(s), or various marks used to uniquely identify a corresponding terminal 10 and relay device 30. In addition, a terminal ID and a relay device ID may be identification information including a combination of at least two of the above-mentioned language, character(s), symbol(s), and various marks.

<Functional Configuration of Management System>

The communication management system 50 includes a data transmitter/receiver 51, a terminal authenticator 52, a terminal manager 53, an extractor 54, an addition request manager 55, a terminal state obtainer 56, a candidate list manager 57, a share request processor 58, and a data processor 59. These elements are functions that are realized by or that are caused to function by operating any of the elements illustrated in FIG. 6 in response to a command from the CPU 201 in accordance with a management system program expanded from the HD 204 to the RAM 203. In addition, the communication management system 50 includes a non-volatile memory 5000 that stores various types of data (or information) to keep data even when the power of the communication management system 50 is turned OFF, and the non-volatile memory 5000 is configured by the HD 204 illustrated in FIG. 6. In addition, the non-volatile memory 5000 stores candidate list frame data illustrated in FIG. 14 (which is data of a candidate list frame portion illustrated in FIG. 14, and which does not include an icon indicating a specific operation state, a terminal ID, or a terminal name).

(Terminal Authentication Management Table)

The non-volatile memory 5000 stores a terminal authentication management DB 5001 configured by a terminal authentication management table such as that illustrated in FIG. 8. In the terminal authentication management table, a password is managed in association with each of terminal IDs of all terminals 10 managed by the communication management system 50. For example, the terminal authentication management table illustrated in FIG. 8 indicates that the terminal ID of the terminal 10aa is "01aa", and the password of the terminal 10aa is "aaaa".

(Terminal Management Table)

The non-volatile memory 5000 stores a terminal management DB 5002 configured by a terminal management table such as that illustrated in FIG. 9. In the terminal management table, for the terminal ID of each terminal 10, a terminal name of the terminal 10, the organization to which the terminal 10 belongs, the operation state of the terminal 10, and the IP address of the terminal 10 are managed in association with one another. For example, in the terminal management table illustrated in FIG. 9, it is indicated that the terminal 10aa with the terminal ID "01aa" has the terminal name "AA terminal, Tokyo office, Japan", the organization "KK Inc.", the operation state "online (communication OK)", and the IP address "1.2.1.3".

(Candidate List Management Table)

The non-volatile memory 5000 stores a candidate list management DB 5003 configured by a candidate list management table such as that illustrated in FIG. 10. In the candidate list management table, for each terminal 10 capable of requesting to start communication ("request sender terminal"), the terminal IDs of counterpart terminals 10 registered as candidate counterpart terminals are managed in association with the terminal ID of the terminal 10. For example, in the candidate list management table illustrated in FIG. 10, it is indicated that candidates for a counterpart terminal to which a terminal (terminal 10aa) whose terminal ID is "01aa" can give a request to start communication in a videoconference are the terminal 10ab whose terminal ID is "01ab", the terminal 10ac whose terminal ID is "01ac", the terminal load whose terminal ID is "01ad", and so forth. These candidates for a counterpart terminal are updated by addition or deletion in response to an addition or deletion request from an arbitrary terminal to the communication system 50. Note that, in the candidate list management DB 5003 (see FIG. 10), not only the terminal ID of a counterpart terminal registered as a candidate for a counterpart terminal, but also a counterpart terminal name managed for each terminal ID in the terminal management table (see FIG. 9) may be managed in association therewith.

(Addition Request Management Table)

The non-volatile memory 5000 stores an addition request management DB 5004 configured by an addition request management table such as that illustrated in FIG. 11. In the addition request management table, the terminal ID of a terminal that has given an addition request for adding a candidate counterpart terminal ("request sender terminal"), and the terminal ID of a terminal serving as a request destination that has been requested to be added as a candidate counterpart terminal ("request destination terminal") are managed in association with each other. Accordingly, it becomes possible to manage from which terminal to which terminal a request has been given for addition as a candidate counterpart terminal. In this example, it is assumed that the request sender terminal capable of starting communication with the candidate counterpart terminal, is the same as the request sender terminal that sends an addition request for adding a candidate counterpart terminal. In such case, since the candidate list management table and the addition request management table are common in the terminal ID of a request sender terminal, these tables may be combined as one.

(Functional Configuration of Management System)

Next, functional configuration of the communication management system 50 will be described in more details. Note that, in the following description of functional configuration of the communication management system 50, among elements illustrated in FIG. 6, relationships with main elements for realizing functional configuration of the communication management system 50 will also be described.

The data transmitter/receiver 51 is realized by a command from the CPU 201 illustrated in FIG. 6 and by the network I/F 209 illustrated in FIG. 6, and performs transmission/reception of various types of data (or information) to/from another terminal, apparatus, or system via the communication network 2.

The terminal authenticator 52 is realized by a command from the CPU 201 illustrated in FIG. 6, and performs terminal authentication by searching the terminal authentication management DB 5001 of the non-volatile memory 5000 by using a terminal ID and a password included in login request information received via the data transmitter/receiver 51 as search keys and determining whether the same pair of a terminal ID and a password is managed in the terminal authentication management DB 5001.

The terminal manager 53 is realized by a command from the CPU 201 illustrated in FIG. 6. In order to manage the operation state of a request sender terminal that has given a login request, the terminal manager 53 manages the terminal ID of the request sender terminal, the operation state of the request sender terminal, and the IP address of the request sender terminal by storing these items of information in association with one another in the terminal management DB 5002 (see FIG. 9). In addition, on the basis of operation state information sent from the terminal 10 indicating that power is turned OFF when the user turns the power switch 109 of the terminal 10 from ON to OFF, the terminal manager 53 changes the operation state indicating an online state to an offline state in the terminal management DB 5002 (see FIG. 9).

The extractor 54 is realized by a command from the CPU 201 illustrated in FIG. 6, searches the candidate list management DB 5003 (see FIG. 10) by using the terminal ID of a request sender terminal that has given a login request as a key, and reads the terminal ID of a candidate counterpart terminal that is able to communicate with the request sender terminal, thereby extracting the terminal ID. In addition, the extractor 54 searches the candidate list management DB 5003 (see FIG. 10) by using the terminal ID of a request sender terminal that has given a login request as a key and also extracts the terminal ID of another request sender terminal that registers the terminal ID of the former request sender terminal as a candidate counterpart terminal. In addition, the extractor 54 searches the terminal management DB 5002 (see FIG. 9) by using the terminal ID of a candidate counterpart terminal extracted by the extractor 54 as a search key, and reads the operation state for each terminal ID extracted by the extractor 54. Accordingly, the extractor 54 can obtain the operation state of a candidate for a counterpart terminal that is able to communicate with a request sender terminal that has given a login request. In addition, the extractor 54 searches the terminal management DB 5002

(see FIG. 9) by using a terminal ID extracted by the extractor 54 as a search key, and also extracts the operation state of a request sender terminal that has given a login request.

The addition request manager 55 is realized by a command from the CPU 201 illustrated in FIG. 6. In one example, the addition request manager 55 stores the terminal ID of a request sender terminal and the terminal ID of a request destination terminal, in the addition request management DB 5004 (see FIG. 11) to create a new record. In another example, the addition request manager 55 deletes the terminal ID of a request sender terminal and the terminal ID of a request destination terminal.

The terminal state obtainer 56 is realized by a command from the CPU 201 illustrated in FIG. 6, and searches the terminal management DB 5002 (see FIG. 9) by using a terminal ID or a counterpart terminal name as a search key, thereby obtaining a corresponding operation state.

The candidate list manager 57 is realized by a command from the CPU 201 illustrated in FIG. 6, and adds or deletes the terminal ID of a counterpart terminal for the terminal ID of each request sender terminal in the candidate list management DB 5003 (see FIG. 10). In addition, with respect to the terminal ID of a request sender terminal in the candidate list management DB 5003 (see FIG. 10), which is the same as the terminal ID of a request sender terminal in the addition request management DB 5004 (see FIG. 11) in this example, the candidate list manager 57 additionally associates the terminal ID of a request destination terminal, which is managed in association with the terminal ID of a request sender terminal in the addition request management DB 5004 (see FIG. 11), as the terminal ID of a counterpart terminal.

The share request processor 58 is realized by a command from the CPU 201. In this example, in response to acceptance of a counterpart terminal information share request, the share request processor 58 determines whether counterpart terminal information serving as a share target is to be registered in the candidate list of a terminal 10 serving as a share destination, and registers the counterpart terminal information in accordance with the determination result. Note that, in the embodiment, the term "share" refers to a state in which, in the candidate list management table (see FIG. 10), a counterpart terminal registered as a candidate counterpart terminal of a certain start request sender terminal is added and registered as a candidate counterpart terminal of another start request sender terminal, thereby enabling communication with that candidate counterpart terminal from both of the start request sender terminals.

The data processor 59 is executed by a command from the CPU 201 illustrated in FIG. 6 and by the HDD 205 illustrated in FIG. 6, and performs processing to store various types of data in the non-volatile memory 5000 or read various types of data stored in the non-volatile memory 5000.

<Functional Configuration of Communication Terminal Management System>

The communication terminal management system 80 includes a data transmitter/receiver 81, a terminal authenticator 82, an extractor 83, a candidate list generator 84, an addition approval request screen generator 85, an organization registration screen generator 86, and a data processor 89. These elements are functions that are realized by or that are caused to function by operating any of the elements illustrated in FIG. 6 in response to a command from the CPU 201 in accordance with a communication terminal management system program expanded from the HD 204 to the RAM 203.

In addition, the communication terminal management system 80 includes a memory 8000 configured by the RAM 203 or the HD 204 illustrated in FIG. 6.

(Functional Configuration of Communication Terminal Management System)

Next, functional configuration of the communication terminal management system 80 will be described in more details. Note that, in the following description of functional configuration of the communication terminal management system 80, among elements illustrated in FIG. 6, relationships with main elements for realizing functional configuration of the communication terminal management system 80 will also be described.

The data transmitter/receiver 81 is realized by a command from the CPU 201 illustrated in FIG. 6 and by the network I/F 209 illustrated in FIG. 6, and performs transmission/reception of various types of data (or information) to/from another terminal, apparatus, or system via the communication network 2. In addition, the data transmitter/receiver 81 also has a web server function and a data processing function, which will be described later.

The terminal authenticator 82, which is realized by a command from the CPU 201 illustrated in FIG. 6, accesses the communication management system 50, and searches the terminal authentication management DB 5001 (see FIG. 8) in the non-volatile memory 5000, to determine whether to authenticate a terminal 10 of the user of a PC 20 as a legitimate terminal in the videoconference system, based on determination of whether the same pair of a terminal ID and a password as that of a request sender terminal is managed.

The extractor 83, which is realized by a command from the CPU 201 illustrated in FIG. 6, searches the candidate list management DB 5003 (see FIG. 10) in the non-volatile memory 5000 in the communication management system 50 by using the terminal ID of a request sender terminal as a search key, to extract the terminal ID of a corresponding counterpart terminal. In another example, the extractor 83 searches the addition request management DB 5004 (see FIG. 11) by using the terminal ID of a request destination terminal, to extract the terminal ID of a corresponding request sender terminal.

The candidate list generator 84 is realized by a command from the CPU 201 illustrated in FIG. 6, and generates the HyperText Markup Language (HTML) of a candidate list illustrated in FIG. 16.

The addition approval request screen generator 85, which is realized by a command from the CPU 201 illustrated in FIG. 6, generates the HTML of an addition approval request screen on the basis of the terminal ID of the request sender terminal, which is extracted by the extractor 83. The organization registration screen generator 86, which is realized by a command from the CPU 201 illustrated in FIG. 6, generates the HTML of an organization registration acceptance screen on the basis of a request for disclosing an organization registration acceptance screen.

<<Example Process or Operation>>

Figure 12:
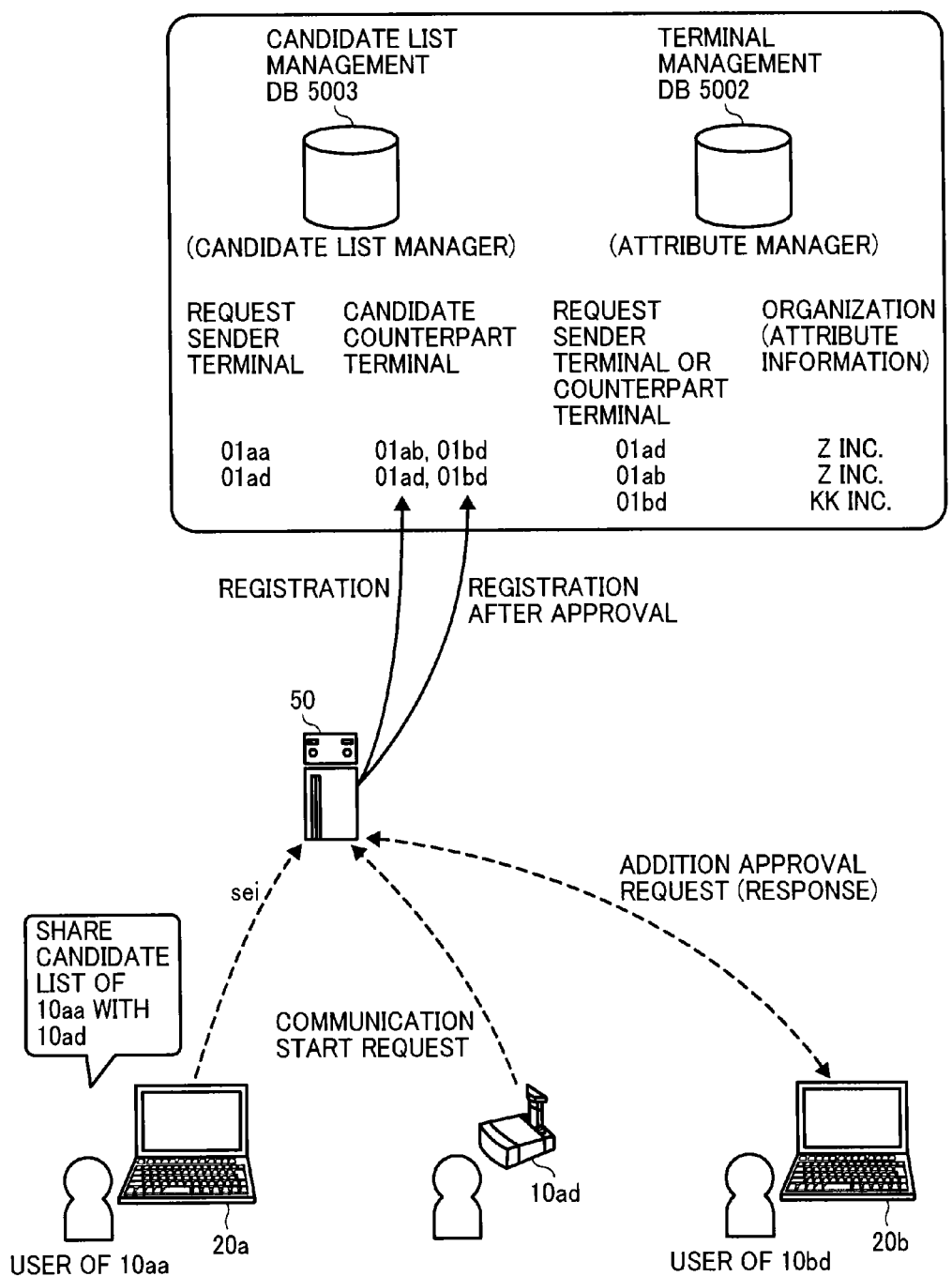
FIG. 12 is a conceptual diagram illustrating a transmission/reception state of various types of information in the communication system.

Next, referring to FIG. 12, example operation performed by the communication system 1 including the communication management system 50 and the communication terminal 10 will be described. FIG. 12 is a conceptual diagram illustrating a transmission/reception state of various types of information in the communication system 1.

In the embodiment illustrated in FIG. 12, the candidate list management DB 5003 of the management system 50 associates for each terminal, a terminal ID for identifying the request sender terminal 10 and a terminal ID for identifying a candidate counterpart terminal 10 that is able to communicate with the request sender terminal 10, to manage association information as a candidate list. For example, referring to FIG. 12, the candidate list management DB 5003 stores the candidate counterpart terminal IDs of the terminals 10*ab* and 10*bd* in association with the terminal ID of the terminal 10*aa*, and the candidate counterpart terminal IDs of the terminals 10*ad* and 10*bd* in association with the terminal ID of the terminal 10*ad*.

In addition, the terminal management DB 5002 of the management system 50 associates for each terminal, the organization to which the terminal belongs (an example of attribute information indicating an attribute of the terminal), with the terminal ID of the terminal. For example, referring to FIG. 12, the terminal management DB 5002 stores the terminal IDs of the terminals 10*ad*, 10*ab*, and 10*db*, in association with the attribute information Z Inc., Z Inc., and KK Inc., respectively.

In one example, the candidate list of the terminal 10*aa* may be shared with the terminal 10*ad*. In such case, the management system 50 receives, at the data transmitter/receiver 51, a request for adding the candidate counterpart terminals 10*ab* and 10*bd* registered in the candidate list of the terminal 10*aa* as candidate counterpart terminals that are able to communicate with the terminal 10*ad*. In this example, it is determined whether to add the terminal 10*ab* to the candidate list of the terminal 10*ad*, as the terminal 10*bd* has been registered in the candidate list. When the organization "Z Inc." stored in association with the terminal ID of the terminal load in the terminal management DB 5002 matches the organization "Z Inc." stored in association with the terminal 10*ab* in the terminal management DB 5002, the candidate list manager 57 stores the terminal ID of the terminal 10*ab* serving as a candidate counterpart terminal in association with the terminal ID of the terminal 10*ad* serving as a start request sender terminal, to update the candidate list management DB 5003. Accordingly, in the communication system 1 in which communication is permitted between candidate counterpart terminals that belong to the same organization, such as in the case of in-house communication, and when there is a request to add the terminal 10*ab* as a candidate counterpart terminal of the terminal 10*ad*, the candidate list can be updated without requesting the terminal 10*ab* to permit addition.

The management system 50 may receive, from the PC 20*a* of the user of the terminal 10, a request to register the organization to which the terminal serving as the start request sender terminal or the candidate counterpart terminal belongs. The terminal manager 53 of the management system 50 stores attribute information indicating an attribute received at the data transmitter/receiver 51 in association with the terminal ID of the request sender terminal or the candidate counterpart terminal, to update the terminal management DB 5002. Accordingly, the management system 50 is able to determine whether to permit addition of a candidate counterpart terminal on the basis of the organization registered by the user of the start request sender terminal or the candidate counterpart terminal, thereby improving reliability.

In the terminal management DB 5002, an IP address, which is one example of address information of the terminal 10, may be stored, instead of an organization as attribute information. In this case, when a few upper digits of the IP address stored in association with the terminal ID of the terminal 10*ad* in the terminal management DB 5002 match a few upper digits of the IP address stored in association with the terminal 10*ab* in the terminal management DB 5002, the candidate list manager 57 stores the terminal ID of the terminal 10*ab* serving as a candidate counterpart terminal in association with the terminal ID of the terminal 10*ad* serving as a start request sender terminal, to update the candidate list management DB 5003. Accordingly, a user is exempted from the burden of registering the organization to which the user belongs.

In the case where the organization "Z Inc." stored in association with the terminal ID of the terminal 10*ad* serving as a start request sender terminal does not match the organization "KK Inc." stored in association with the terminal ID of the terminal 10*bd* serving as a candidate counterpart terminal in the terminal management DB 5002, the data transmitter/receiver 51 of the management system 50 receives addition approval response information indicating approval for adding the terminal 10*bd* as a candidate counterpart terminal that is able to communicate with the terminal 10*ad* serving as a start request sender terminal. In the case of receiving addition approval response information indicating approval at the data transmitter/receiver 51, the candidate list manager 57 stores the terminal ID of the terminal 10*bd* serving as a candidate counterpart terminal in association with the terminal ID of the terminal 10*ad* serving as a start request sender terminal, thereby updating the candidate list management DB 5003. Accordingly, even in the case where a start request sender terminal and a candidate counterpart terminal belong to different organizations, a candidate counterpart terminal can be added while maintaining security by going through the above-described approval process.

Note that the above-described organization is not particularly limited and may be the organization to which a terminal 10 serving as a start request sender terminal or a candidate counterpart terminal belongs, or may be the organization to which the user of a terminal 10 serving as a start request sender terminal or a candidate counterpart terminal belongs.

Figure 13B:
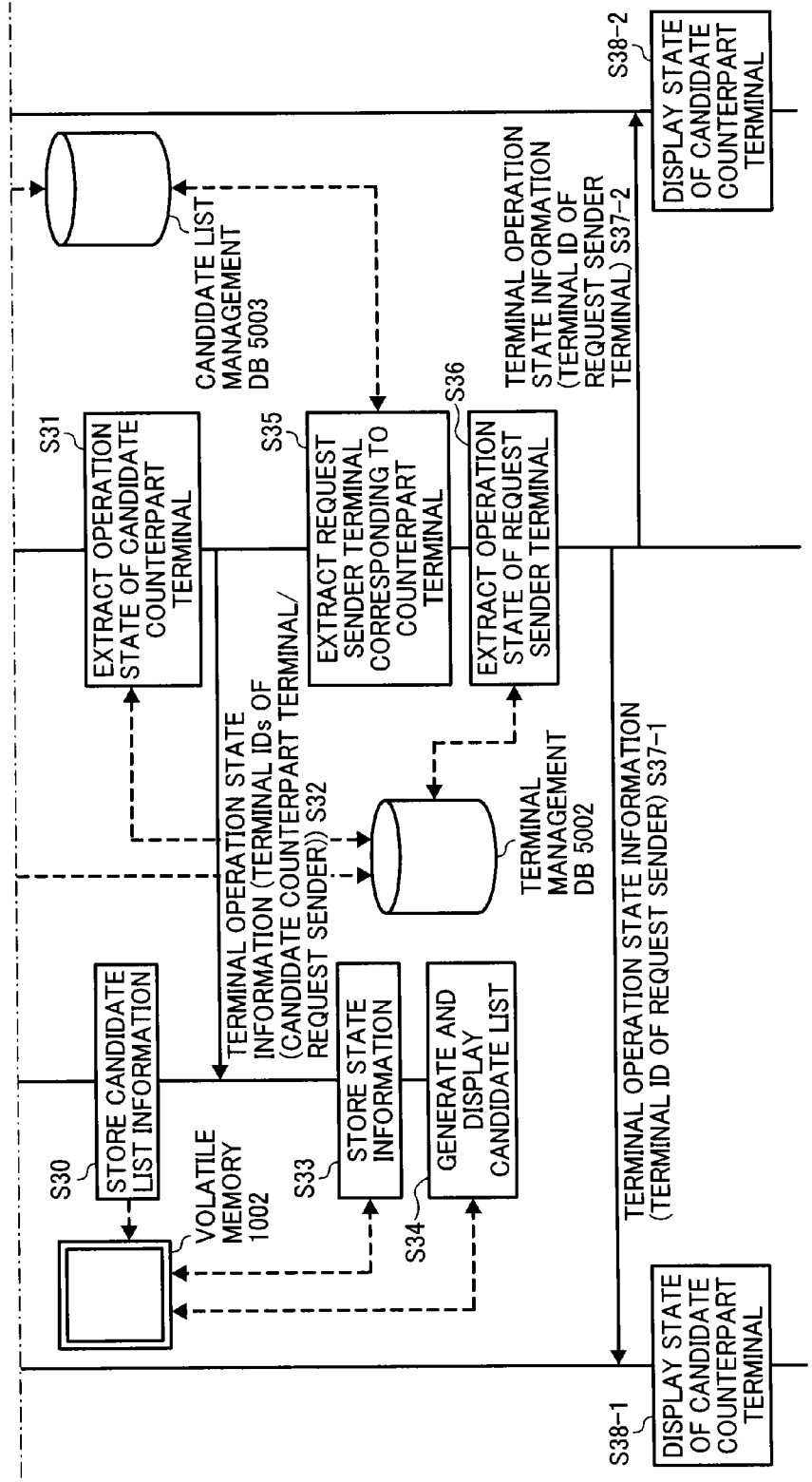

Next, referring to FIGS. 13 to 21, operation of managing candidate counterpart terminal information is explained according to an example embodiment of the present invention. At first, operation of transmitting/receiving management information to prepare for starting communication, for example, between the terminal 10*aa* and the terminal 10*ad* will be described using FIGS. 13 and 14. FIG. 13 is a sequence diagram illustrating operation of preparing for starting communication between communication terminals. FIG. 14 is a conceptual diagram illustrating a candidate list. Note that FIG. 13 illustrates operation of transmitting/receiving various items of management information through a management information session sei.

First, when the user turns ON the power switch 109 illustrated in FIG. 5, the operation input acceptor 12 illustrated in FIG. 7 accepts a power ON instruction and turns ON the power (step S21). In response to acceptance of the power ON operation, the login requester 13 automatically transmits login request information indicating a login request from the data transmitter/receiver 11 to the communication management system 50 via the communication network 2 (step S22). The login request information includes a terminal ID for identifying the terminal 10*aa*, which serves as a request sender terminal, and a password. The terminal ID and the password are data that have been read via the data processor 19 from the non-volatile memory 1001 and sent to the data transmitter/receiver 11. In the case of transmitting login request information from the terminal 10*aa* to the communication management system 50, the communication management system 50, which is a receiving side, can obtain the IP address of the terminal 10*aa*, which is a transmitting side.

Next, the terminal authenticator 52 of the communication management system 50 performs terminal authentication by searching the terminal authentication management DB (see FIG. 8) of the non-volatile memory 5000 by using the terminal ID and the password included in the login request information received via the data transmitter/receiver 51 as search keys, and determining whether the same terminal ID and the same password are managed in the terminal authentication management DB 5001 (step S23). In the case where the terminal authenticator 52 determines that the login request is a login request from a terminal 10 that has a legitimate use authority since the same terminal Ill and the same password are managed, the terminal manager 53 stores, in the terminal management DB 5002 (see FIG. 9), the operation state and the IP address of the terminal 10aa for a corresponding record indicated by the terminal ID and counterpart terminal name of the terminal 10aa (step S24). Accordingly, the operation state "online" and the IP address "1.2.1.3" are managed in association with the terminal ID "01aa" in the terminal management table illustrated in FIG. 14.

The data transmitter/receiver 51 of the communication management system 50 transmits authentication result information indicating an authentication result obtained by the above-described terminal authenticator 52 to the request sender terminal (terminal 10aa), which has given the above-mentioned login request, via the communication network 2 (step S25). In the embodiment, the case in which the terminal authenticator 52 determines that the terminal 10aa is a terminal that has a legitimate use authority will be described as follows.

In response to reception, by the request sender terminal (terminal 10aa), of the authentication result information indicating that the request sender terminal is a terminal that has a legitimate use authority, the data transmitter/receiver 11 transmits candidate list request information indicating a request for the candidate list to the communication management system 50 via the communication network 2 (step S26). Accordingly, the data transmitter/receiver 51 of the communication management system 50 receives the candidate list request information.

Next, the extractor 54 searches the candidate list management DB 5003 (see FIG. 10) by using the terminal ID "01aa" of the request sender terminal (terminal 10aa) which sends the login request as a search key, extracts the terminal ID of a candidate for a counterpart terminal that is able to communicate with the request sender terminal (terminal 10aa), and extracts a counterpart terminal name corresponding to this terminal ID by reading the counterpart terminal name from the terminal management DB (see FIG. 9) (step S27). Here, the terminal IDs ("01ab", "01ac", "01ad", "01ae") of counterpart terminals (10ab, 10ac, 10ad, 10ae) corresponding to the terminal ID "01aa" of the request sender terminal (terminal 10aa), and terminal names ("AB terminal, Tokyo office, Japan", "AC Branch, Z Inc.", "AD Branch, Z Inc.", "AE terminal, Tokyo office, Japan") corresponding to these terminal IDs are extracted. Note that, in the case where not only terminal IDs but also counterpart terminal names corresponding to the terminal IDs are managed in the candidate list management DB 5003 (see FIG. 10), the counterpart terminal names corresponding to the terminal IDs may be read not from the terminal management table (see FIG. 9), but from the candidate list management table in step S27.

Next, the data transmitter/receiver 51 of the communication management system 50 reads candidate list frame data from the memory 5000 via the data processor 59 (step S28), and transmits "candidate list information (candidate list frame, terminal IDs, and counterpart terminal names)", which includes the candidate list frame and the terminal IDs and the counterpart terminal names extracted by the extractor 54, to the request sender terminal (terminal 10aa) (step S29). Accordingly, in the request sender terminal (terminal 10aa), the data transmitter/receiver 11 receives the candidate list information, and the data processor 19 stores the candidate list information in the volatile memory 1002 (step S30).

As described above, in the embodiment, each terminal 10 does not manage candidate list information, but the communication management system 50 centrally manages candidate list information of all terminals 10. Therefore, even in the case where a new terminal 10 is included in the communication system 1, a terminal 10 of a new model is included in place of an already-included terminal 10, or the appearance of the candidate list frame is to be changed, the communication management system 50 centrally handles these cases, and hence, the burden of each terminal 10 changing candidate list information can be removed.

In addition, the extractor 54 of the communication management system 50 searches the terminal management DB 5002 (see FIG. 9) by using the terminal IDs ("01ab", "01ac", "01ad", "01ae") of candidate counterpart terminals, which are extracted by the above-mentioned extractor 54, as search keys, and reads a corresponding operation state for each terminal ID extracted by the above-mentioned extractor 54, thereby obtaining the operation state of each of the terminals (10ab, 10ac, 10ad, 10ae) serving as candidate counterpart terminals (step S31).

Next, the data transmitter/receiver 51 transmits "terminal operation state information" including the terminal IDs and the operation states of the candidate counterpart terminals via the communication network 2 (step S32).

The data processor 19 of the request sender terminal (terminal 10aa) stores the terminal state information, received from the communication management system 50, in the volatile memory 1002 (step S33). Thus, by receiving the above-described state information of each terminal, the request sender terminal (terminal 10aa) can obtain the current operation state of each candidate counterpart terminal, such as the operation state of the terminal 10ab which is able to communicate with the request sender terminal (terminal 10aa).

The candidate list generator 18 of the request sender terminal (terminal 10aa) generates a candidate list in which the state of a candidate counterpart terminal is reflected, on the basis of the candidate list information and the terminal state information stored in the volatile memory 1002, and controls the timing at which the display control 16 displays the candidate list on the display 120 illustrated in FIG. 5 (step S34). Note that, in the candidate list illustrated in FIG. 14, an icon indicating the operation state of each terminal 10 indicates the following from top: "online (communication OK)", "offline", "online (communication OK)", and "online (communicating)". In addition, "transmission OK" means "communication OK" in a videoconference system as in the embodiment.

The extractor 54 of the communication management system 50 searches the candidate list management DB 5003 (see FIG. 10) on the basis of the terminal ID "01aa" of the request sender terminal (terminal 10aa) which has given the login request, to extract the terminal ID of another request sender terminal that registers the terminal ID "01aa" of the above-mentioned request sender terminal (terminal 10aa) as a candidate for a counterpart terminal (step S35). In the candidate list management table illustrated in FIG. 10, the terminal IDs of other request sender terminals to be extracted are "01ab", "01ac", and "01ad".

Next, the extractor 54 of the communication management system 50 searches the terminal management DB 5002 (see FIG. 9) on the basis of the terminal ID "01aa" of the request sender terminal (terminal 10aa) which has given the login request, and obtains the operation state of the request sender terminal (terminal 10aa) which has given the login request (step S36).

The data transmitter/receiver 51 transmits "terminal state information" including the terminal ID "01aa" and the operation state "online" of the request sender terminal (terminal 10aa), obtained in step S36 described above, to terminals (10ab and load) whose operation states are "online" in the terminal management DB 5002 (see FIG. 9), among the terminals (10ab, 10ac, and 10ad) according to the terminal IDs ("01ab", "01ac", and "01db") extracted in step S35 described above (steps S37-1 and S37-2). When transmitting the terminal state information to the terminals (10ab and 10ad), the data transmitter/receiver 51 refers to the IP addresses of the terminals, which are managed in the terminal management table illustrated in FIG. 14, on the basis of the terminal IDs ("01ab" and "01ad"). Accordingly, the terminal ID "01aa" and the operation state "online" of the request sender terminal (terminal 10aa) which has given the login request can be conveyed to other counterpart terminals (10ab and 10ad) that are able to communicate with the request sender terminal (terminal 10aa) which has given the login request, which serves as a counterpart terminal.

In any other desired terminals 10, as in step S21 described above, when the user turns ON the power switch 109 illustrated in FIG. 6, the operation input acceptor 12 illustrated in FIG. 7 accepts the power ON instruction and performs processing that is the same as or similar to steps S22 to S38-1 and S38-2 described above.

Figure 15:
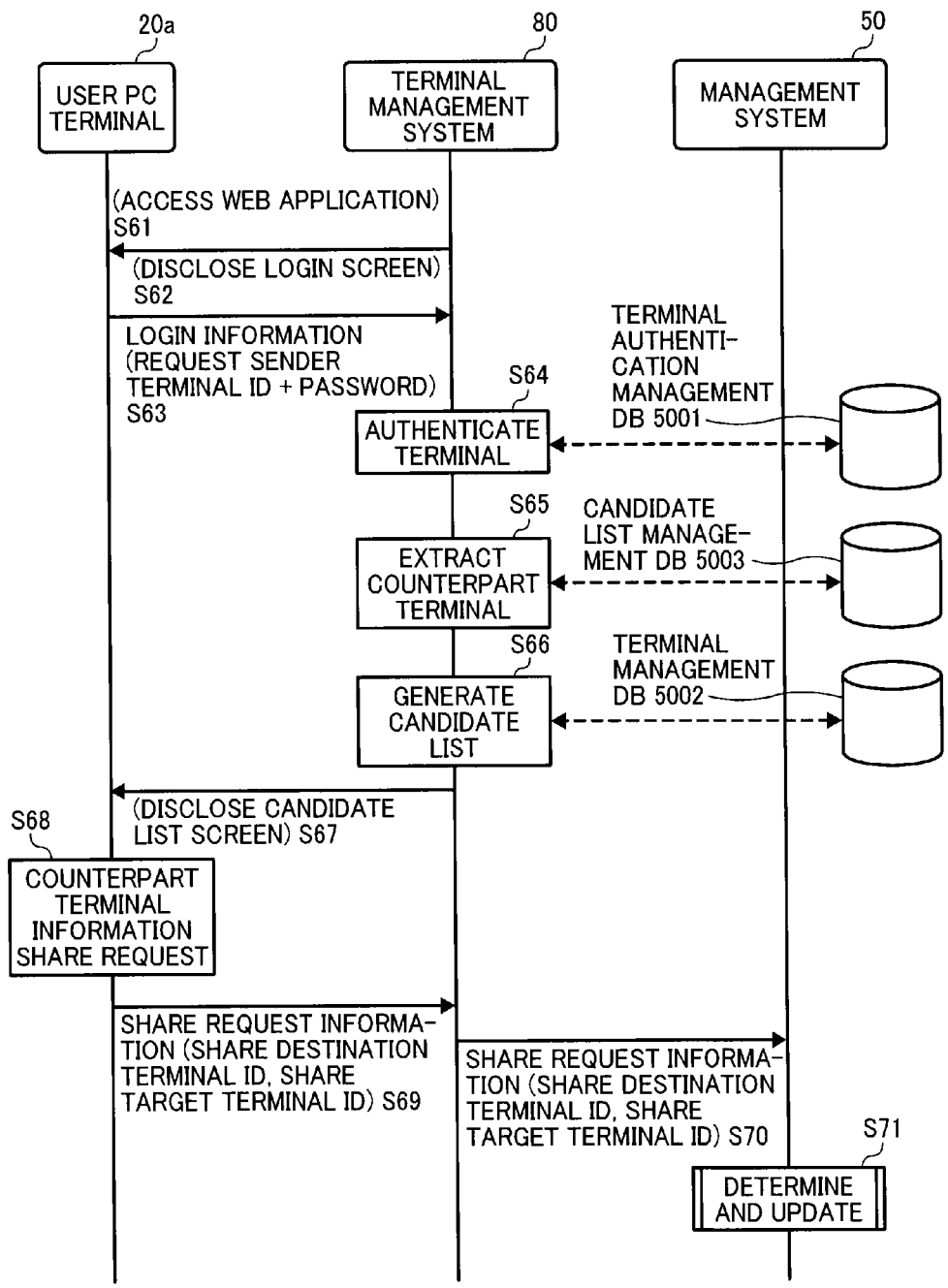
FIG. 15 is a sequence diagram illustrating operation of sending a share request from a user personal computer (PC) terminal.

Next, the case in which the PC 20a, operated by the user a of the request sender terminal (terminal 10aa) sends a candidate list share request to the request destination terminal (terminal 10dc) via the communication terminal management system 80 will be described. Note that FIG. 15 is a sequence diagram of sending a share request from a PC. FIG. 16 is a conceptual diagram illustrating a candidate list. FIG. 17 is a conceptual diagram illustrating a share destination acceptance screen.

As illustrated in FIG. 15, first, the user a of the PC 20a inputs a uniform resource locator (URL) from a web browser on the PC 20a, thereby accessing a web application provided by the communication terminal management system 80 (step S61). Accordingly, the web server function of the data transmitter/receiver 81 of the communication terminal management system 80 discloses a login screen to the PC 20a, thereby prompting the user a to input the terminal ID and password of the request sender terminal (terminal 10aa) (step S62). When the user a inputs the terminal ID and password of the request sender terminal (terminal 10aa) in response to this, the PC 20a transmits login information including the terminal ID and password of the request sender terminal to the communication terminal management system 80 (step S63).

Next, the terminal authenticator 82 of the communication terminal management system 80 accesses the communication management system 50 and searches the terminal authentication management DB 5001 (see FIG. 8) in the non-volatile memory 5000, to determine whether to authenticate whether the terminal 10aa of the user a of the PC 20a is a legitimate terminal in the communication system 1, based on determination of whether the same pair of a terminal ID and a password as that of the request sender terminal is managed (step S64). In the case where the terminal 10aa is determined as a legitimate terminal by this authentication, the extractor 83 searches the candidate list management DB 5003 (see FIG. 10) in the non-volatile memory 5000 in the communication management system 50 on the basis of the terminal ID "01aa" of the request sender terminal, to extract the terminal ID of a corresponding counterpart terminal (step S65).

Next, the candidate list generator 84 searches the terminal management DB 5002 (see FIG. 9) on the basis of the terminal ID extracted in step S65 described above, to extract a corresponding terminal name. Using the extracted information, the candidate list generator 84 generates the candidate list screen, in the form of HTML, as illustrated in FIG. 16 (step S66). The web server function of the data transmitter/receiver 81 discloses the candidate list screen to the PC 20a, as illustrated in FIG. 16 (step S67). FIG. 16 is a conceptual diagram illustrating a candidate list. The candidate list screen displays the counterpart terminal name of a counterpart terminal, the terminal ID of the counterpart terminal, and an operation region that allows the user to edit the counterpart terminal name of each counterpart terminal on the list, delete the counterpart terminal name and the terminal ID of the counterpart terminal from the candidate list, or share the candidate list. In this example, an "add counterpart terminal" key that is pressed by a user in the case of adding a counterpart terminal is displayed in the upper right-hand corner of the candidate list screen. Note that the candidate list screen illustrated in FIG. 16 is an example of a screen that accepts selection of a share request and is not limited to that illustrated in FIG. 16. Another example of the candidate list screen may be one in which a key for accepting a share request is provided outside the candidate list of a terminal 10, and, in response to pressing of that key, selection of a share target or a share destination is accepted. Alternatively, a check box may be provided next to each terminal name, thereby enabling selection of candidate lists of a plurality of terminals 10 as share targets.

Next, when the user a presses, with the PC 20a, a "share" link associated with the terminal ID "01ab" in an operation portion of the candidate list screen, the PC 20a accepts, out of counterpart terminal information indicating candidate counterpart terminals of the terminal 10aa, counterpart terminal information indicating the terminal 10ab (step S68). Next, the web browser function of the PC 20a displays, on the display 120a, a share destination acceptance dialog such as that illustrated in FIG. 17. FIG. 17 is a conceptual diagram illustrating a share destination acceptance screen.

The share destination acceptance dialog displays, as candidates for a share destination, among terminals 10 registered as candidate counterpart terminals of the terminal 10aa in the candidate list management table (see FIG. 10), the terminals (10ac, 10ad, and 10ae) other than the terminal 10ab (hereinafter referred to as a share target terminal). When the user a selects, for example, the terminal 10ad from among these candidates for a share destination by using a check box and presses a "share" key, the PC 20a transmits to the communication terminal management system 80 share request information indicating a request for sharing, with the terminal 10ad, counterpart terminal information indicating the terminal 10ab (step S69). The share request information includes the terminal ID "01ab" of the share target terminal (terminal 10ab) and the terminal ID "01ad" of the share destination terminal (10ad).

Accordingly, the data processing function of the data transmitter/receiver 81 of the communication terminal management system 80 analyzes the operation from the user a, and transmits to the communication management system 50 share request information for sharing the candidate list, in place of the terminal 10aa (step S70). Although a share target terminal is selected first and then a share destination terminal is selected next in the flow in the embodiment, this order may be opposite; the flow may be such that a share destination terminal is selected first and then a share target terminal is selected next.

The share request information is accepted by being received by the data transmitter/receiver 51 of the communication management system 50. In response to acceptance of the share request information, the share request processor 58 of the communication management system 50 determines whether it is allowed to add the share target terminal (terminal 10ab) as a candidate counterpart terminal of the terminal 10ad which is the share destination, and updates the candidate list in accordance with the determination result (step S71). Here, the processing in step S71 will be described in more detail using FIG. 18. FIG. 18 is a flowchart illustrating operation of determining whether to add the share target terminal, which is performed after the communication management system 50 receives the share request information.

First, the data processor 59 of the communication management system 50 searches the candidate list management table (see FIG. 10) by using the terminal ID of a share destination terminal as a search key, to extract the terminal ID of a corresponding counterpart terminal (step S71-1) that is associated with the share destination terminal. In the case where the share target terminal has already been registered as a candidate counterpart terminal that is able to communicate with the share destination terminal in the candidate list management table, that is, in the case where the terminal ID of the share target terminal is included in a terminal ID(s) extracted in step S71-1 (YES in step S71-2), operation ends since it is unnecessary to update the candidate list management table. Note that, in the case where the terminal 10ac has been selected as a share destination terminal and the terminal 10ab has been selected as a share target in the embodiment of the present invention, operation ends since a share target terminal (terminal 10ab) has already been registered as a candidate counterpart terminal that is able to communicate with the share destination terminal (terminal 10ac) in the candidate list management table.

In the case where the share target terminal is not registered as a candidate counterpart terminal that is able to communicate with the share destination terminal in the candidate list management table (NO in step S71-2), the data processor 59 of the communication management system 50 searches the terminal management table (see FIG. 9) by using the terminal ID of the share destination terminal and the terminal ID of the share target terminal as search keys, thereby extracting the organizations to which the share destination terminal and the share target terminal belong (step S71-3).

The share request processor 58 compares the organizations to which the share destination terminal and the share target terminal belong. In the case where it is determined based on the comparison result that the organizations to which these terminals 10 belong match (YES in step S71-4), the share request processor 58 associates and stores the terminal ID of the share target terminal in a field of a candidate counterpart terminal in a record where the terminal ID of the share destination terminal is registered as a communication start request sender terminal in the candidate list management table (see FIG. 10), thereby updating the candidate list management table (step S71-5). In this embodiment, it is determined whether to update a candidate list based on comparison in organizations between a share destination terminal and a share target terminal. Alternatively, any other attribute of the share destination terminal and the share target terminal may be used to determine to update a candidate list. For example, the share request processor 58 may compare the IP addresses of a share destination terminal and a share target terminal and determine whether a few upper digits match, thereby determining whether the share destination terminal and the share target terminal belong to the same organization and determining whether to update a candidate list.

In the case where the terminal 10ae has been selected as a share destination terminal and the terminal 10ab has been selected as a share target in the embodiment of the present invention, the organization to which the terminal 10ae belongs and the organization to which the terminal 10ab belongs match and are both "KK Inc." in the terminal management table (see FIG. 9), and thus it is determined that the terminals 10ae and 10ab belong to the same organization. In this case, the share request processor 58 stores the terminal ID "01ab" of the share target terminal in the candidate counterpart terminal field of a record where the terminal ID "01ae" of the share destination terminal is registered as a communication start request sender terminal in the candidate list management table (see FIG. 10), to update the candidate list management table. Further, in order to enable communication from the terminal 10ae, which is the share target terminal, to the terminal 10ab, which is the share destination terminal, the share request processor 58 stores the terminal ID "01ae" of the share target terminal in the candidate counterpart terminal field of a record where the terminal ID "01ab" of the share destination terminal is registered as a communication start request sender terminal, to update the candidate list management table.

In the case where it is determined that the share destination terminal and the share target terminal belong to different organizations as a result of comparing the organizations to which the share destination terminal and the share target terminal belong (NO in step S71-4), for security reasons, it is determined not to automatically update the candidate list management DB 5003. If a share target terminal that belongs to an organization different from that of a share destination terminal is unconditionally not to be registered, there will be no means to share counterpart terminal information of a terminal 10 that belongs to an organization different from that of the share destination terminal. Therefore, in the embodiment, instead of the share request processor 58 updating the candidate list management table, the addition request manager 55 registers a counterpart terminal addition approval request from the share destination terminal to the share target terminal in the addition request management DB 5004 (step S71-6).

In the embodiment of the present invention, in the case where the terminal load has been selected as a share destination terminal and the terminal 10ab has been selected as a share target, in the terminal management table (see FIG. 9), the organization to which the terminal load serving as the share destination terminal belongs is "Z Inc.", and the organization to which the terminal 10ab serving as the share target terminal belongs is "KK Inc.", which are different. Therefore, it is regarded that the organizations are different, and the share request processor 58 does not update the candidate list management table (see FIG. 10). Instead, the addition request manager 55 registers, in the addition request management table 5004 (see FIG. 11), the terminal ID "01ad" of the addition request sender terminal and the terminal ID "01ba" of the addition request destination terminal in association with each other, thereby updating the addition request management table.

Next, referring to FIGS. 19 and 20, the case in which the PC 20*b*, operated by the user b of the request destination terminal 10*ba*, sends an addition request response will be described. Here, the case in which, immediately after the user b activates the PC 20*b*, whether an addition approval request from another terminal 10 or another PC 20 has been accepted is confirmed will be described. Note that this case is only exemplary, and confirmation of whether an addition approval request has been accepted may be periodically or arbitrarily performed by the user b after the user b activates the PC 20*b*.

Figure 19A:
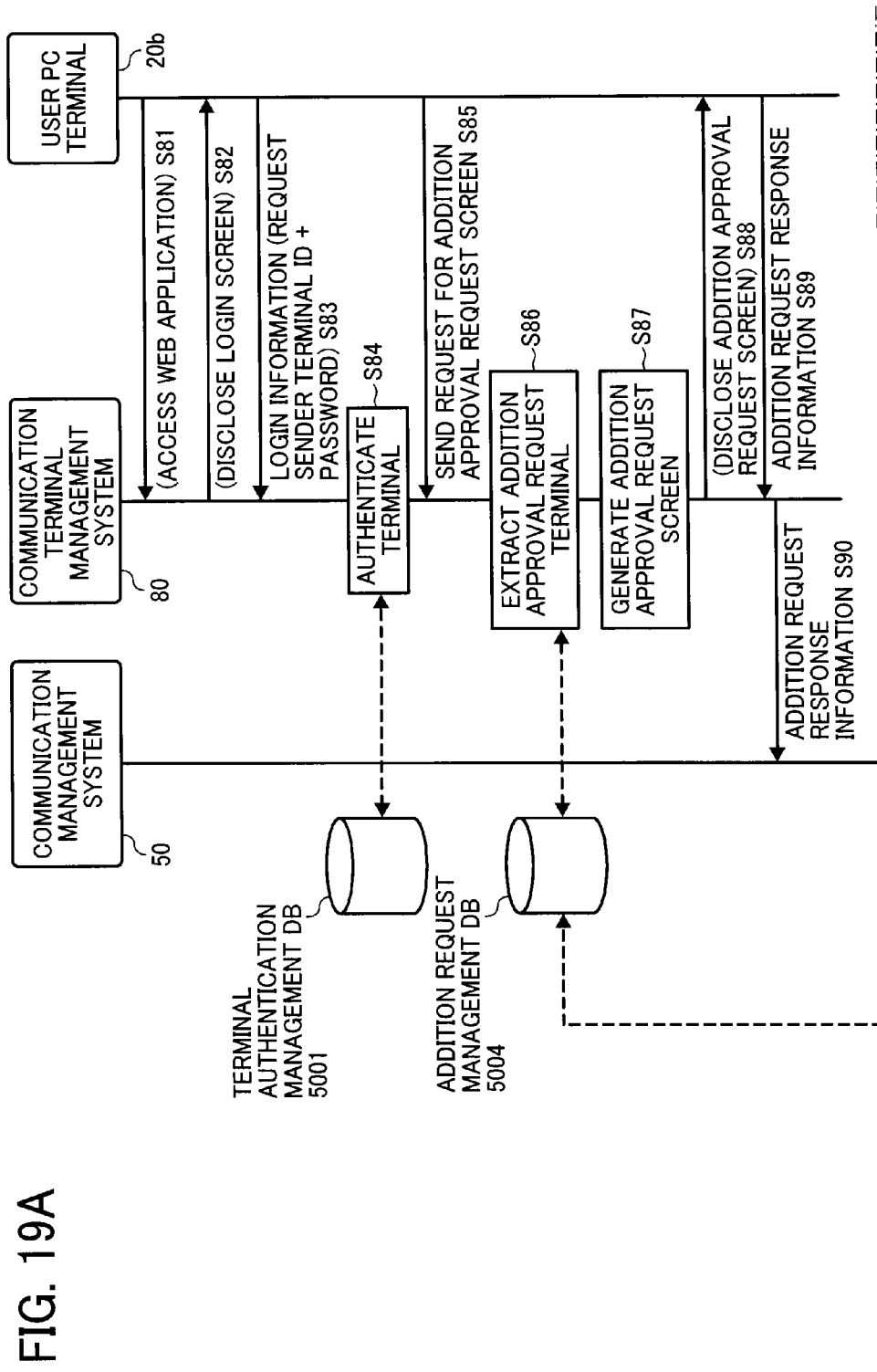
FIGS. 19A and 19B (FIG. 19) is a data sequence diagram of sending an addition request response.
Figure 19B:
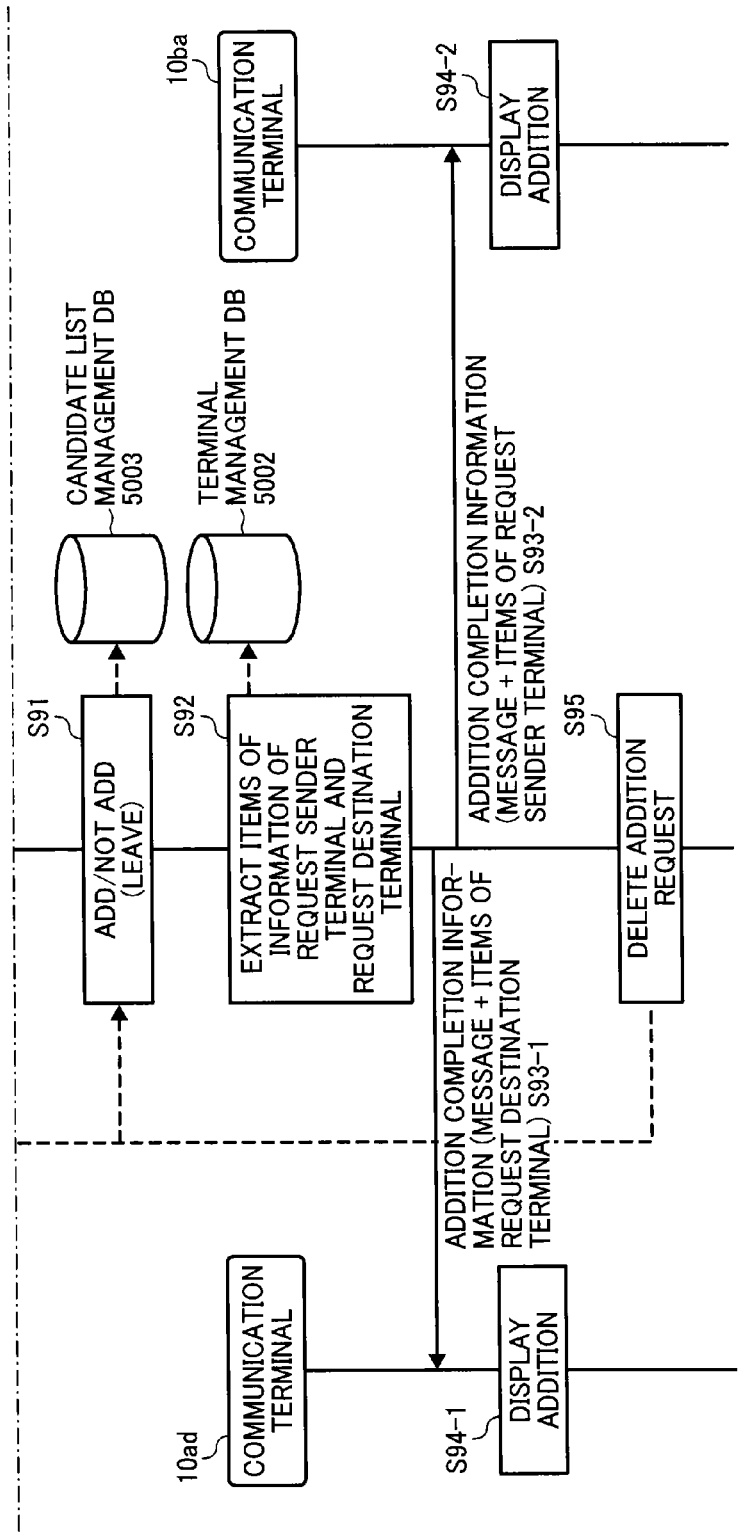

Note that FIG. 19 is a sequence diagram in the case where the PC, operated by the user of a request destination terminal, sends an addition request response. FIG. 20 is a conceptual diagram illustrating an addition approval request screen. In addition, since steps S81 to S84 in FIG. 19 are the same as steps S61 to S64 described above, descriptions thereof are omitted.

First, the PC 20*b*, operated by the user b of the request destination terminal 10*ba* sends a request for an addition approval request screen to the communication terminal management system 80 (step S85). Accordingly, in the communication terminal management system 80, the extractor 83 searches the addition request management DB 5004 (see FIG. 11) on the basis of the terminal ID "01ba" of the request destination terminal (terminal 10*ba*), thereby extracting the terminal ID "01ad" of a corresponding request sender terminal (step S86). Note that the extractor 83 may further extract a corresponding counterpart terminal name by searching the terminal management DB 5002 (see FIG. 9) on the basis of the terminal ID "01ad" of the request sender terminal in step S86.

The addition approval request screen generator 85 generates the HTML of an addition approval request screen on the basis of the terminal ID "01ad" of the request sender terminal (terminal 10*ad*), which is extracted in step S86 described above (step S87). The web server function of the data transmitter/receiver 81 discloses an addition approval request screen such as that illustrated in FIG. 20 to the PC 20*b* (step S88).

Figure 20:
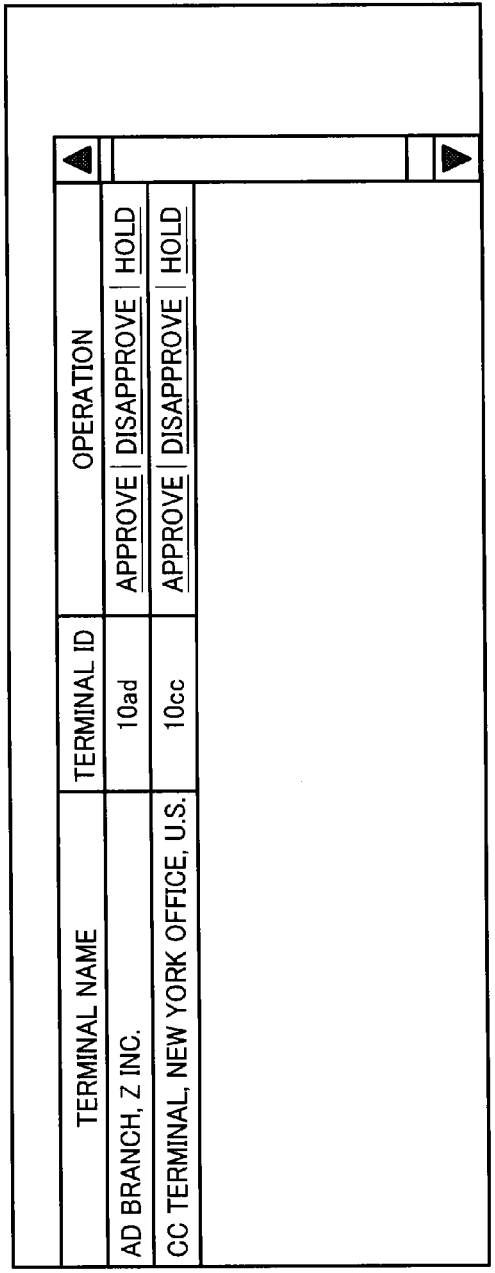
FIG. 20 is a conceptual diagram illustrating an addition approval request screen.

When the user b selects approval, disapproval, or hold on the addition approval request screen illustrated in FIG. 20, the PC 20*b* transmits to the communication terminal management system 80 addition request response information indicating approval, disapproval, or hold (step S89). The data processing function of the data transmitter/receiver 81 of the communication terminal management system 80 analyzes the operation from the user b, and transmits to the communication management system 50 addition request response information, in place of the request destination terminal (terminal 10*ba*) (step S90). Accordingly, the data transmitter/receiver 51 of the communication management system 50 receives the addition request response information. Here, the case in which the addition request response indicates "approval" will be continuously described.

Next, the candidate list manager 57 additionally stores the terminal ID "01ba" of the request destination terminal, which is associated with the terminal ID "01ad" of the request sender terminal in the addition request management DB 5004 (see FIG. 11), in association with the terminal ID "01ad" of the request sender terminal in the candidate list management DB (see FIG. 10), which is the same as the terminal ID "01ad" of the request sender terminal in the addition request management DB 5004 (see FIG. 11) (step S91).

Note that, in the case where the addition request response indicates "disapproval", in step S91 described above, the addition request manager 55 deletes the record of the terminal ID "01ba" of the request destination terminal, which has been disapproved, in the addition request management DB 5004 (see FIG. 11). Alternatively, in the case where the addition request response indicates "hold", in step S91 described above, the addition request manager 55 does not perform additional management, and the candidate list manager 57 leaves the record as it is without deleting it.

Next, the extractor 54 searches the terminal management DB 5002 (see FIG. 9) on the basis of the terminal ID "01ad" of the request sender terminal and the terminal ID "01ba" of the request destination terminal, thereby extracting items of corresponding information (counterpart terminal names) thereof (step S92). The data transmitter/receiver 51 transmits addition completion information to the request sender terminal (terminal 10*ad*) and the request destination terminal (terminal 10*ba*) (steps S93-1 and S93-2). Among these items of information, the addition completion information transmitted to the request sender terminal (terminal 10*ad*) includes a message indicating that addition is completed, and items of information (terminal ID and counterpart terminal name) of the request destination terminal (terminal 10*ba*). That is, only items of information (terminal ID and counterpart terminal name) of the request destination terminal (terminal 10*ba*) portion in the candidate list are transmitted to the request sender terminal (terminal 10*ad*), and the entire candidate list is not transmitted again. The addition completion information transmitted to the request destination terminal (terminal 10*ba*) includes a message indicating that addition is completed, and items of information (terminal ID and counterpart terminal name) of the request sender terminal (terminal 10*aa*).

Figure 21:
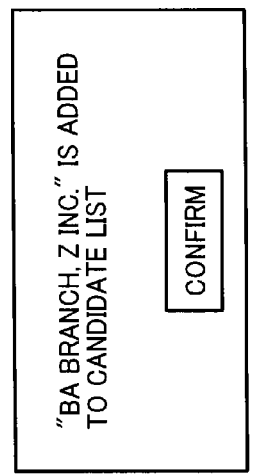
FIG. 21 is a conceptual diagram illustrating an addition completion screen.

In the request sender terminal (terminal 10*ad*) and the request destination terminal (terminal 10*ba*), each display control 16 displays a screen indicating completion, such as that illustrated in FIG. 21, on each of the displays (120*ad* and 120*ba*) (steps S94-1 and S94-2). Note that FIG. 21 is a conceptual diagram illustrating an addition completion screen. FIG. 21 illustrates an addition completion screen displayed on the display 120*ad* of the request sender terminal (terminal load). The operation ends when the user presses a "confirm" key. Accordingly, with display of the addition completion screen illustrated in FIG. 21, the user can promptly notice that the addition request has been approved, and a conference can be immediately started with the added counterpart terminal.

Note that, on the communication management system 50 side, when the processing in steps S93-1 and S93-2 described above ends, the addition request manager 55 deletes the record of the terminal ID "01ba" of the request destination terminal, which has been approved, in the addition request management DB 5004 (see FIG. 11), and accordingly the entire candidate counterpart terminal addition request process ends (step S95). In the above-described process, in response to approval of an addition request, a share target terminal is first registered in the candidate list management table as a candidate counterpart terminal that is able to communicate with a share destination terminal. Accordingly, even with counterpart terminal information determined to indicate a different organization, sharing becomes possible while maintaining security by going through the above-described approval process.

Figure 22:
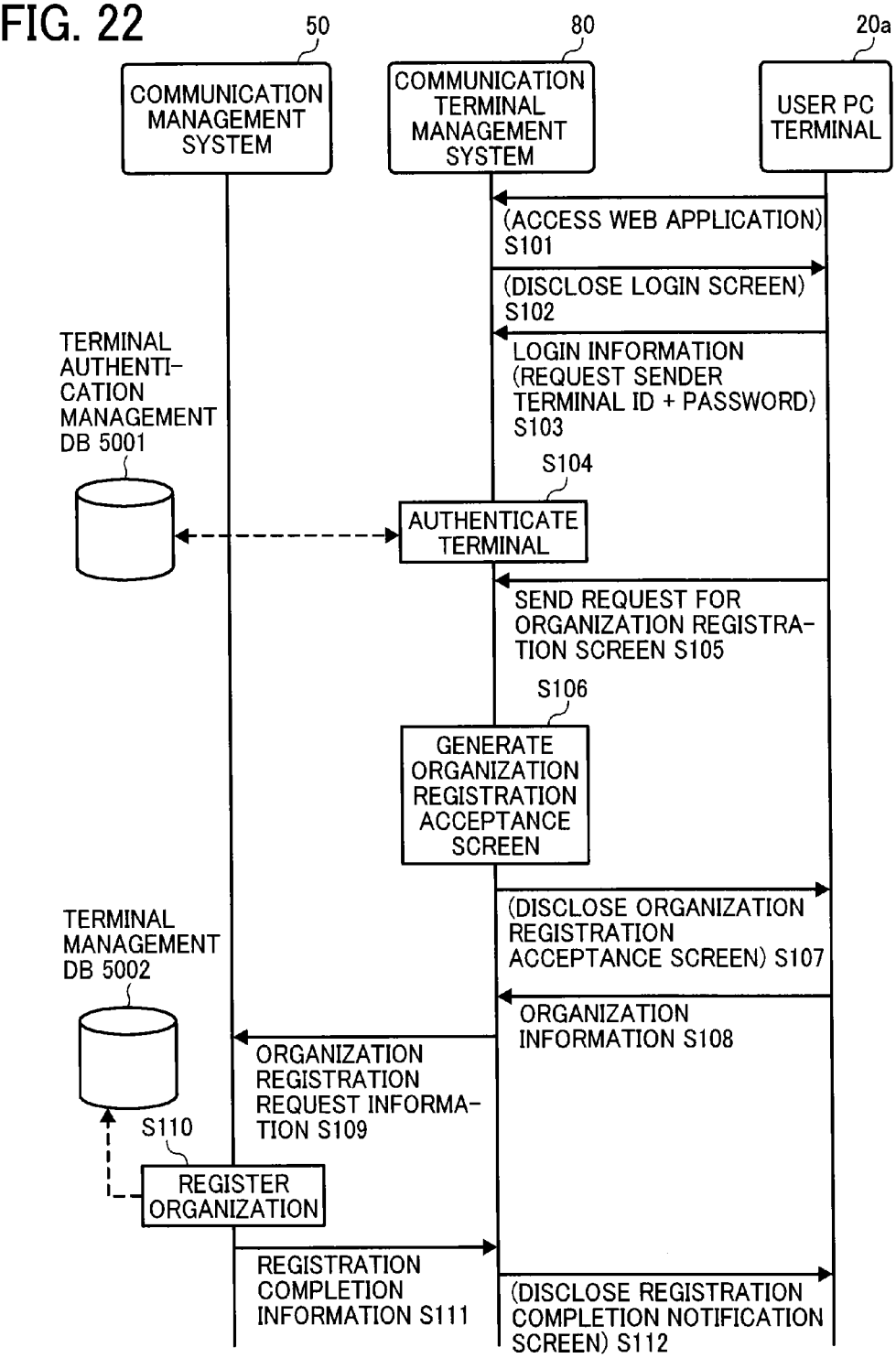
FIG. 22 is a data sequence diagram illustrating operation of registering the organization to which the terminal belongs.

Next, using FIG. 22, the case in which the PC 20a, operated by the user a of the terminal 10aa, registers the organization to which the terminal 10aa belongs will be described. Note that FIG. 22 is a sequence diagram in the case where the user of a terminal uses a PC to register the organization to which the terminal belongs. In addition, since steps S101 to S104 in FIG. 22 are the same as steps S61 to S64 described above, descriptions thereof are omitted.

First, the PC 20a, operated by the user a of the terminal 10aa, sends a request for disclosing an organization registration acceptance screen to the communication terminal management system 80 (step S105). Accordingly, the organization registration screen generator 86 of the communication terminal management system 80 generates the HTML of an organization registration acceptance screen (step S106). The web server function of the data transmitter/receiver 81 discloses the organization registration acceptance screen to the PC 20a (step S107).

Next, the user a inputs the organization name of the organization to which the terminal 10aa belongs on the organization registration acceptance screen, and, in response to this, the PC 20a transmits to the communication terminal management system 80 organization information indicating the organization name to be registered (step S108). The data processing function of the data transmitter/receiver 81 of the communication terminal management system 80 analyzes the operation from the user a, and the data transmitter/receiver 81 transmits to the communication management system 50 organization registration request information, in place of the terminal 10aa (step S109). The organization registration request information includes the terminal ID "01aa" of the terminal 10aa, and the organization name accepted by the user PC terminal 20a. Accordingly, the data transmitter/receiver 51 of the communication management system 50 receives the organization registration request information.

Next, the terminal manager 53 additionally records the organization name included in the organization registration request information in an organization field of the record of the terminal ID "01aa" of the request sender terminal in the terminal management DB 5002 (see FIG. 9) (step S110). The data transmitter/receiver 51 transmits to the communication management system 50 registration completion information indicating completion of organization registration (step S111). This registration completion information includes the terminal ID of the request sender terminal (terminal 10aa).

Accordingly, the organization registration screen generator 86 of the communication terminal management system 80 generates the HTML of an organization registration completion notification screen for giving a notification of completion of organization registration, and the web server function of the data transmitter/receiver 81 discloses the organization registration completion notification screen to the PC 20a (step S112).

As described above, in some embodiments, the management system 50 determines whether attribute information match between the request sender terminal and the candidate counterpart terminal to be added to the candidate list of the request sender terminal. When the attribute information match, the management system 50 automatically updates the candidate list of the request sender terminal so as to further include the candidate counterpart terminal, without requesting for approval to add.

With this configuration, in a communication system in which communication between terminals that have the same attribute is permitted, in response to a request for adding a specific candidate counterpart terminal as a candidate counterpart terminal of a specific request sender terminal, the management system automatically adds the specific candidate counterpart terminal having the same attribute as that of the specific request sender terminal, while eliminating approval process. Accordingly, the overall operation can be simplified, while at the same time achieving a sufficient level of security.

Note that the relay devices 30, the communication management system 50, the communication terminal management system 80, the program providing system 90, and the maintenance system 100 in the above-described embodiment may be configured by a single computer or a plurality of computers to which divided elements (functions) are arbitrarily allocated. In addition, in the case where the program providing system 90 is configured by a single computer, a program transmitted by the program providing system 90 may be separately transmitted in units of a plurality of modules, or may be transmitted in its entirety. Further, in the case where the program providing system 90 is configured by a plurality of computers, a program may be divided into a plurality of modules, and the modules may be individually transmitted from the respective computers.

In addition, a recording medium having recorded thereon the terminal program, relay terminal program, communication management program, or communication terminal management program in the above-described embodiment, the HD 204 storing these programs, and the program providing system 90 including the HD 204 are each used in the case where the terminal program, relay terminal program, communication management program, and communication terminal management program are provided as a program product to users within a certain country or outside that country.

In addition, although the case of a videoconference system has been described as an example of the communication system 1 in the above-described embodiment, the embodiment is not limited to this case, and the communication system 1 may be a phone system such as an Internet Protocol (IP) phone system or an Internet phone system. In addition, the communication system 1 may be a car navigation system. In this case, for example, one of two terminals 10 corresponds to a car navigation apparatus mounted on a car, and the other terminal 10 corresponds to a management terminal or a management server of a management center that manages car navigation, or a car navigation apparatus mounted on another car.

Further, the communication system 1 may be a cellular phone communication system. In this case, for example, the terminals 10 correspond to cellular phones.

In addition, image data serving as sight data and audio data serving as hearing data are described as examples of content data in the above-described embodiment, the content data is not limited to these items of data, and the content data may be other five-sense data. For example, in the case where the content data is touch data, a feeling obtained by a user's contact at one terminal is transmitted to the other terminal side. Further, in the case where the content data is smell data, a smell at one terminal side is transmitted to the other terminal side. In addition, in the case where the content data is taste data, a taste at one terminal side is transmitted to the other terminal side.

Further, the content data may be at least one of image (sight) data, audio (hearing) data, touch data, smell data, and taste data.

Figure 23:
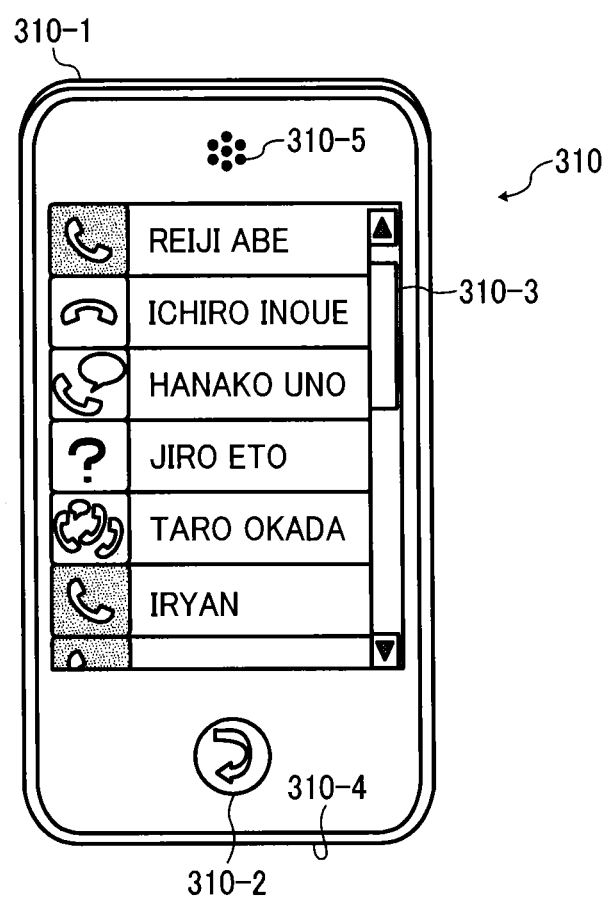
FIG. 23 is a conceptual diagram illustrating a candidate list according to another embodiment.

The communication system 1 may be a cellular phone communication system. In this case, for example, the terminals 10 correspond to cellular phones. FIG. 23 illustrates a display example of a candidate list in this case. FIG. 23 is a conceptual diagram illustrating a candidate list according to another embodiment. That is, a terminal 310 serving as a mobile phone includes a main body 310-1 of the mobile phone, a menu screen display key 310-2 provided on the main body 310-1, a display 310-3 provided on the main body 310-1, a microphone 310-4 provided at a lower portion of the main body 310-1, and a speaker 310-5 provided on the main body 310-1. Among these elements, the "menu screen display key" 310-2 is a key for displaying a menu screen where icons indicating various applications are displayed. The display 310-3 is a touch panel, and, when the user selects a counterpart terminal name, the mobile phone is able to communicate with a counterpart mobile phone.

In addition, although the case in which a videoconference is held by the communication system 1 has been described in the above-described embodiment, the embodiment is not limited to this case. The communication system may be used in meetings, general conversation between family members or friends, or one-way presentation of information.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. A counterpart terminal management apparatus comprising:
   a memory configured to
      store, for each one of a plurality of terminals, attribute information relating to an attribute of the terminal in association with terminal identification information that identifies the terminal; and
      store, for each request sender terminal of the plurality of terminals, a candidate list of one or more candidate counterpart terminals of the plurality of terminals that the request sender terminal is capable of communicating with;
   a receiver configured to receive a request for adding a specific candidate counterpart terminal of the plurality of terminals to the candidate list of a specific request sender terminal of the plurality of terminals; and
   processing circuitry configured to
      determine whether first attribute information stored in association with the specific request sender terminal matches second attribute information stored in association with the specific candidate counterpart terminal;
      control the memory to, when a determination result indicates that the first and second attribute information match, store counterpart terminal identification information that identifies the specific candidate counterpart terminal in association with terminal identification information of the specific request sender terminal to update the candidate list of the specific request sender terminal; and
      when the determination result indicates that the first and second attribute information do not match;
         control the memory to register an approval request to add the specific candidate counterpart terminal to the candidate list of the specific request sender terminal;
         determine whether an approval to add the specific candidate counterpart terminal to the candidate list of the specific request sender terminal is received at the receiver; and
         update, when the approval is received at the receiver, the candidate list of the specific request sender terminal to further include the specific candidate counterpart terminal.

2. The counterpart terminal management apparatus according to claim 1, wherein the processing circuitry controls the memory to store the attribute information of the terminal in response to the receiver receiving a request to register the attribute information of the terminal.

3. The counterpart terminal management apparatus according to claim 1, wherein the processing circuitry is configured to update the candidate list of the specific request sender terminal to further include the specific candidate counterpart terminal when the determination result indicates that address information stored in association with the specific start request sender terminal at least partially matches address information stored in association with the specific candidate counterpart terminal.

4. The counterpart terminal management apparatus according to claim 1, wherein the attribute information further includes at least one of:
    terminal attribute information indicating an attribute of the terminal; and
    user attribute information indicating an attribute of a user who operates the terminal.

5. A communication system comprising:
    the counterpart terminal management apparatus according to claim 1; and
    a first terminal that sends the request for adding the specific candidate counterpart terminal to the counterpart terminal management apparatus, the first terminal being one of the plurality of terminals or a terminal operated by a user of the one of the plurality of terminals.

6. The communication system of claim 5, further comprising:
    a second terminal that sends approval for adding the specific candidate counterpart terminal to the candidate list of the specific request sender terminal, to the counterpart terminal management apparatus.

7. A method of managing candidate counterpart terminal information, comprising:
    storing, for each one of a plurality of terminals in a memory, attribute information relating to an attribute of the terminal in association with terminal identification information that identifies the terminal;
    storing, for each request sender terminal of the plurality of terminals in the memory, a candidate list of one or more candidate counterpart terminals of the plurality of terminals that the request sender terminal is capable of communicating with;
    receiving a request for adding a specific candidate counterpart terminal of the plurality of terminals to the candidate list of a specific request sender terminal of the plurality of terminals;
    determining whether first attribute information stored in association with the specific request sender terminal matches second attribute information stored in association with the specific candidate counterpart terminal;
    storing, in the memory when a determination result indicates that the first and second attribute information match, counterpart terminal identification information that identifies the specific candidate counterpart terminal in association with terminal identification information of the specific request sender terminal to update the candidate list of the specific request sender terminal; and
    when the determination result indicates that the first and second attribute information do not match:
        registering, in the the memory, an approval request to add the specific candidate counterpart terminal to the candidate list of the specific request sender terminal;
        determining whether an approval to add the specific candidate counterpart terminal to the candidate list of the specific request sender terminal is received at the receiver; and
        updating, when the approval is received at the receiver, the candidate list of the specific request sender terminal to further include the specific candidate counterpart terminal.

8. The method of claim 7, further comprising:
    storing the attribute information of the terminal in the memory, in response to receiving a request to register the attribute information of the terminal.

9. The method of claim 7, wherein the determining includes determining whether address information stored in association with the specific start request sender terminal at least partially matches address information stored in association with the specific candidate counterpart terminal, and the method further comprises updating the candidate list of the specific request sender terminal to include the specific candidate counterpart terminal when the address information stored in association with the specific start request sender terminal at least partially matches the address information stored in association with the specific candidate counterpart terminal.

10. The method of claim 7, wherein the attribute information further includes at least one of:
    terminal attribute information indicating an attribute of the terminal; and
    user attribute information indicating an attribute of a user who operates the terminal.

11. A non-transitory recording medium storing a plurality of instructions which, when executed by one or more processors, cause the processors to perform a method, the method comprising:
    storing, for each one of a plurality of terminals in a memory, attribute information relating to an attribute of the terminal in association with terminal identification information that identifies the terminal;
    storing, for each request sender terminal of the plurality of terminals in the memory, a candidate list of one or more candidate counterpart terminals of the plurality of terminals that the request sender terminal is capable of communicating with;
    receiving a request for adding a specific candidate counterpart terminal of the plurality of terminals to the candidate list of a specific request sender terminal of the plurality of terminals;
    determining whether first attribute information stored in association with the specific request sender terminal matches second attribute information stored in association with the specific candidate counterpart terminal;
    storing, in the memory when a determination result indicates that the first and second attribute information match, counterpart terminal identification information that identifies the specific candidate counterpart terminal in association with terminal identification information of the specific request sender terminal to update the candidate list of the specific request sender terminal; and
    when the determination result indicates that the first and second attribute information do not match:
        registering, in the memory, an approval request to add the specific candidate counterpart terminal to the candidate list of the specific request sender terminal;
        determining whether an approval to add the specific candidate counterpart terminal to the candidate list of the specific request sender terminal is received at the receiver; and
        updating, when the approval is received at the receiver, the candidate list of the specific request sender terminal to further include the specific candidate counterpart terminal.

\* \* \* \* \*